"" US006188558B1

(12) United States Patent  (10) Patent No.: US 6,188,558 B1
Lacerda  (45) Date of Patent: Feb. 13, 2001

(54) INTERNAL COMBUSTION ENGINE WITH RAIL SPARK PLUGS AND RAIL FUEL INJECTORS

(76) Inventor: Carlos Bettencourt Lacerda, 47 Taylor Dr., Rumford, RI (US) 02916-1016

(*) Notice: Under 35 U.S.C. 154(b), the term of this patent shall be extended for 0 days.

(21) Appl. No.: 09/108,097

(22) Filed: Jun. 30, 1998

Related U.S. Application Data

(62) Division of application No. 08/795,768, filed on Feb. 5, 1997, now Pat. No. 5,799,628.

(51) Int. Cl.$^7$ .................................................. H01H 73/00
(52) U.S. Cl. .............................................. 361/115; 361/118
(58) Field of Search ..................................... 361/115, 118; 307/10.1; 123/143 B, 297; 336/212

(56) References Cited

U.S. PATENT DOCUMENTS

| 1,687,425 | 10/1928 | Briggs . | |
|---|---|---|---|
| 2,366,237 | 1/1945 | Clausen . | |
| 3,911,307 | 10/1975 | Goto et al. | 313/143 |
| 3,961,607 | 6/1976 | Brems | 123/78 R |
| 4,041,922 | 8/1977 | Abe et al. | 123/260 |
| 4,122,816 | 10/1978 | Fitzgerald | 123/598 |
| 4,416,226 | 11/1983 | Nishida et al. | 123/143 B |
| 4,463,710 | 8/1984 | McWhorter | 123/48 B |
| 4,485,768 | 12/1984 | Heniges | 123/48 B |
| 4,584,972 | 4/1986 | Jayne et al. | 123/56 C |
| 4,598,672 | 7/1986 | Jayne et al. | 123/56 R |
| 4,685,342 | 8/1987 | Brackett | 74/49 |
| 4,760,820 | 8/1988 | Tozzi | 123/143 B |
| 4,803,890 | 2/1989 | Giuliani et al. | 74/32 |
| 4,852,529 | 8/1989 | Vowles | 123/143 B |
| 4,887,560 | 12/1989 | Heniges | 123/78 F |
| 4,969,432 | 11/1990 | Scharnweber | 123/297 |
| 4,979,427 | 12/1990 | Pfeffer et al. | 123/48 B |
| 5,076,223 | 12/1991 | Harden et al. | 123/143 B |
| 5,211,142 | * 5/1993 | Matthews et al. | 123/143 B |
| 5,259,256 | 11/1993 | Brackett | 74/49 |
| 5,361,737 | 11/1994 | Smith et al. | 123/143 B |
| 5,375,566 | 12/1994 | Brackett | 123/55 R |
| 5,377,652 | 1/1995 | Noble et al. | 123/634 |
| 5,715,788 | * 2/1998 | Tarr et al. | 123/297 |
| 5,841,336 | * 11/1998 | Rapoport et al. | 336/212 |

* cited by examiner

Primary Examiner—Stephen W. Jackson

(57) ABSTRACT

A two stroke cycle reciprocating piston internal combustion engine having horizontally opposed cylinders and pistons, scotch yokes and self adjusting sliding blocks for the interface between the scotch yokes and crankpins, and secondary cylindrical pistons to maintain the scotch yokes in perpendicular vertical alignment with the crankpins. The secondary cylindrical pistons also operate as valves to open exhaust ports. A supercharger forces air through intake ports and into the main cylinders, then into secondary cylinders, and scavenges the exhaust gases through the exhaust ports. There is no carburetor and no adjustable distributor but rather ignition signals within its operating range, at a certain angle before top dead center. In addition, a capacitive discharge ignition system using multiple transformer ignition coils for each cylinder and rail spark plugs with multiple sets of rails to ignite very lean air/fuel mixtures. And lastly, a capacitive discharge system with rail fuel injectors, to supply the required amount of fuel into each cylinder at the proper time.

18 Claims, 20 Drawing Sheets

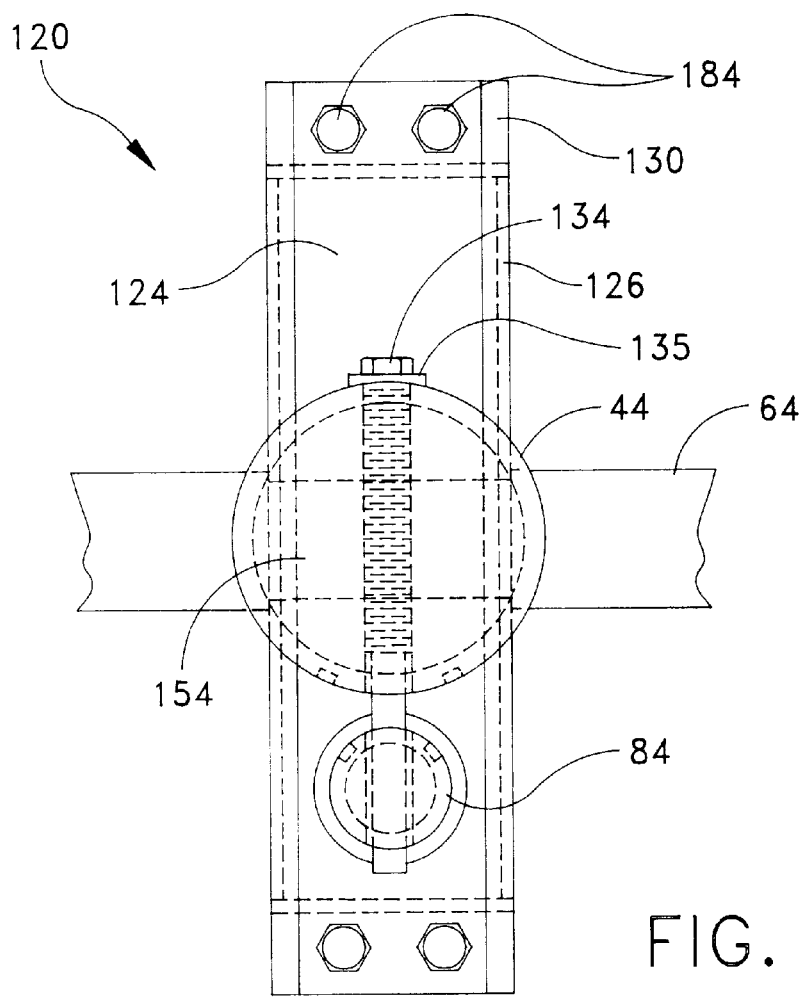
FIG. 5
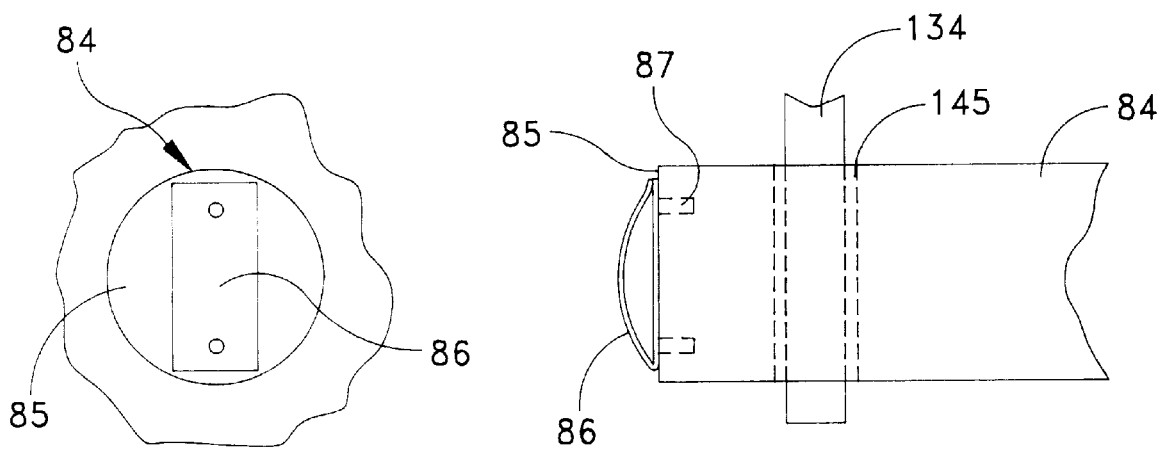
FIG. 6
FIG. 7

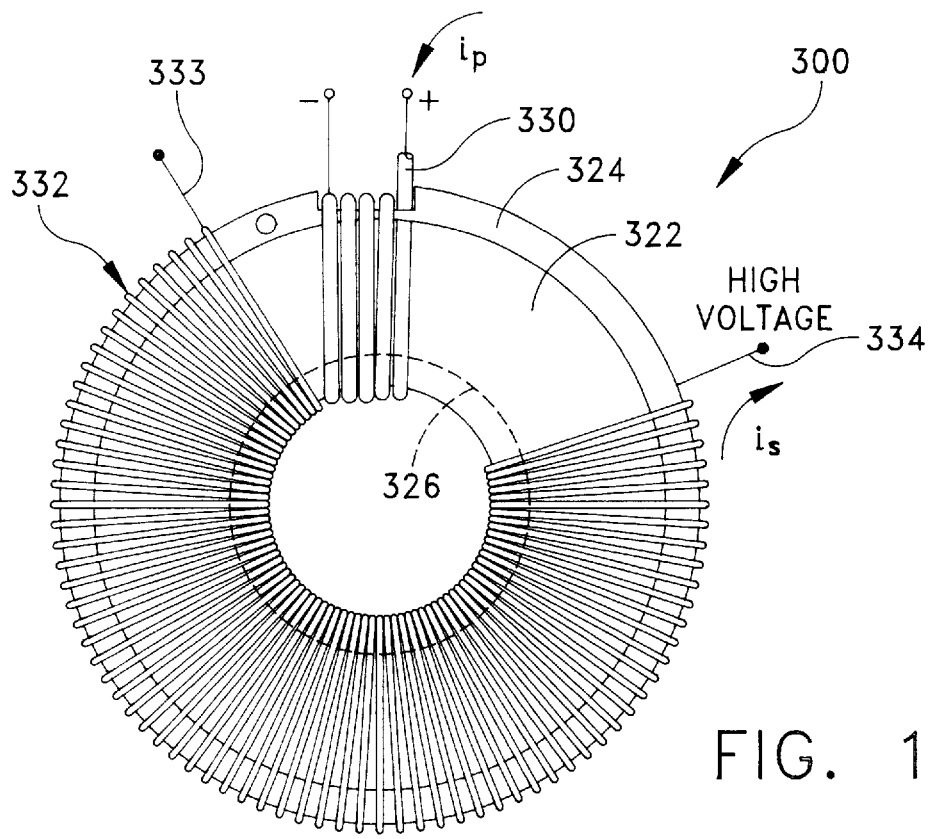
FIG. 15
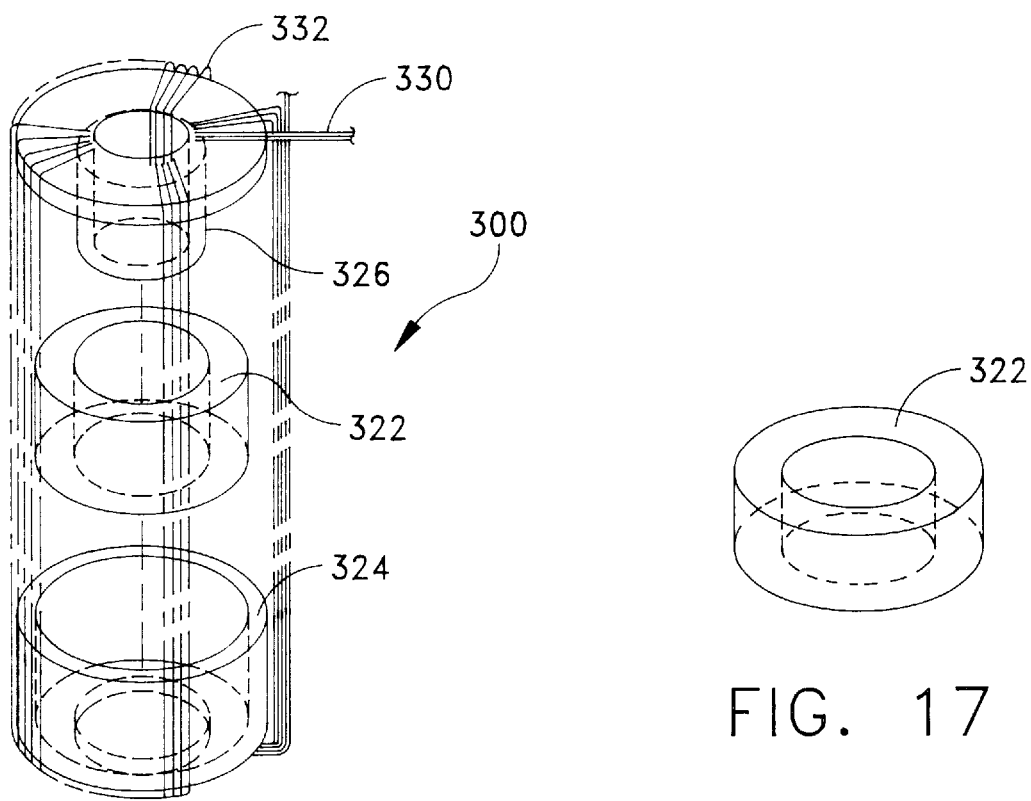
FIG. 16
FIG. 17

INTERNAL COMBUSTION ENGINE WITH RAIL SPARK PLUGS AND RAIL FUEL INJECTORS

This application is a Divisional of Ser. No. 08/795,768 filed Feb. 5, 1997 now U.S. Pat. No. 5,799,628.

FIELD OF THE INVENTION

The present invention concerns internal combustion engines, and particularly reciprocating piston engines utilizing scotch yokes to translate rectilinear to rotary motion. The present invention also concerns rail spark plugs with multiple transformer ignition coils, and rail fuel injectors. It will become evident that these improvements will produce a more efficient engine and lower the amount of pollutants in the exhaust.

DESCRIPTION OF THE PRIOR ART

Many engine designs have been proposed over the years to improve performance and efficiency. The most familiar design is the conventional reciprocating piston internal combustion engine. It uses connecting rods to connect the pistons to the crankpins of a crankshaft to translate linear reciprocating motion of the pistons to rotary motion of the crankshaft. A connecting rod is articulable at both ends where it attaches to the piston and crankpin. The piston is connected to the connecting rod by a wrist pin that passes through the piston and the connecting rod. This design is known as the slider crank engine. It has proven its usefulness, but does have some disadvantages and limitations.

Many ideas have been proposed to improve the slider crank engine. For example: supplemental pistons and cylinders converging into a shared combustion chamber, see U.S. Pat. No. 3,961,607; connecting rods with a pair of wrist pins, see U.S. Pat. No. 4,463,710; and pistons with variable compression height, see U.S. Pat. No. 4,979,427. Many contemporary engines use multiple valves and overhead cams. Each of these results in a more complex engine having more parts and greater reciprocating mass and total engine mass. Further, it is unlikely that power loss caused by friction from the side loading of the pistons and the pendulous motion of the connecting rods can be reduced.

The scotch yoke has been used in certain engine designs seeking improved cycle dynamics over the slider crank engine. For example, see U.S. Pat. Nos. 4,485,768, 4,584, 972, 4,598,672, 4,803,890, 4,887,560, and 5,375,566. These efforts though creative, either use many parts in a complex arrangement or contain certain weaknesses of the traditional scotch yoke design. The traditional design connects two horizontally opposed pistons by rigid non-articulable connecting rods to a shuttle having a slot which accommodates the crankpin of a crank shaft. Guide surfaces constrain the motion of the shuttle to a linear path and the crankpin slides within the slot as the crankshaft rotates through its range, converting the linear reciprocating piston motion to rotary crankshaft motion. The slot within the shuttle must be at least as wide as the crankpin diameter and at least as long as the diameter of crankpin travel. There are two competing objectives in the design of the crankpin and slot interface for scotch yokes, reduce friction and reduce clearance. Friction causes energy loss and in wear of the scotch yoke, but especially in wear of the crankpin, because its curved surface is tangent to the slot's planar surface. Clearance at the interface results in a loss of shuttle motion during traversal of the clearance gap, and in impact damage and vibrations when the crankpin accelerates across the clearance gap and collides against the shuttle. The effects of friction and clearance at the crankpin and slot interface are energy inefficiency, and excessive wear and tear.

Various methods have been proposed to simultaneously reduce friction and crankpin clearance. For example, in U.S. Pat. No. 1,687,425 a spring forced lever presses against the crankpin to eliminate excess clearance. In U.S. Pat. No. 2,366,237 the shuttle includes a bearing block having a center roller bearing for the crankpin and side roller bearings to reduce friction between the block and the remainder of the shuttle. See also U.S. Pat. Nos. 4,685,342, 5,259,256, and 5,375,566.

New methods are sought to increase the efficiency of conventional internal combustion engines to conserve fuel and protect the environment. One method is to operate the engine with a much leaner air/fuel mixture. This will reduce fuel requirements and also lower the amount of pollutants emitted into the air. Various problems are encountered in the development of leaner burning engines. A much hotter electrical energy source is required in order to ignite the leaner mixtures and ignition does not guarantee effective combustion of the airfuel mixture. Lean mixtures burn more slowly, and have a lower energy release rate, which results in decreased thermal efficiency and an increase in fuel consumption. Misfire and partial burn limits are reached as the mixture becomes leaner. When the lean operating limit is reached, the hydrocarbon emissions start to increase rather than decrease as expected.

One solution is to ignite the mixture on a larger scale instead of at a point.

This reduces the distance the flame must propagate and minimizes flame quench by providing a much larger initial flame and greater energy release which will help ignite the remaining mixture. Many methods have been proposed, for example: spark plugs with two or three electrodes, see U.S. Pat. No. 5,394,855; ignition transformer on spark plug for a hotter spark, see U.S. Pat. No. 5,377,652; lasers, see U.S. Pat. No. 4,416,226, and 4,852,529; plasma jet ignitors, see U.S. Pat. Nos. 3,911,307, 4,041,922, 4,122,816, 4,760,820, 4,969,432, and 5,076,223; and radio frequency ignitors, see U.S. Pat. No. 5,361,737. These approaches are either inadequate or too complex.

Conventional mechanical fuel injectors are complex and costly. They must be precisely manufactured to deliver accurate quantities of fuel and require high pressure fuel pumps. Conventional electronic fuel injectors have a slow response time for direct injection into a combustion chamber and therefore provide inadequate performance at high engine speeds. The rail fuel injector that will be described is a type of electronic fuel injector with a minimum of moving parts that will use electromagnetic forces to quickly inject fuel into a combustion chamber.

The present invention thus seeks to provide a new and novel engine having horizontally opposed cylinders and pistons, a type of scotch yoke with self adjusting sliding blocks, multiple transformer ignition coils and rail spark plugs, and rail fuel injectors. The objective is to produce a mechanically simple and highly efficient engine having a high power to weight ratio, reduced friction and pumping losses, having a minimum of moving parts, and reduced pollution emissions.

SUMMARY OF THE INVENTION

The problems and disadvantages associated with conventional reciprocating piston internal combustion engines are overcome by the present invention which includes a 2-stroke cycle reciprocating internal combustion engine having horizontally opposed cylinders and pistons, scotch yokes and self adjusting sliding blocks for the interface between the scotch yokes and crankpins, cylindrical piston valves to open exhaust ports (or the intake ports) and maintain the scotch yokes in vertical alignment with the crankpins, supercharger to force air into the cylinders and scavenge the exhaust gases, no carburetor, no adjustable distributor but rather ignition signals within the operating range at a certain angle before top dead center regardless of engine speed, capacitive discharge ignition system using multiple transformer ignition coils for each cylinder and rail spark plugs with multiple rails to ignite very lean air/fuel mixtures, and capacitive discharge system with rail fuel injectors to supply the required amount of fuel into each cylinder at the proper time.

The proposed railgun spark plugs or railplugs of the present invention operate on electromagnetic principles, which may produce electromagnetic forces many times greater than thermal expansion forces. By supplying current to electrodes or rails, current flowing in the rails creates an electromagnetic field between the rails in the railplug. The interaction of this field with the plasma current creates a J×B electromagnetic force (Lorentz force) which accelerates the arc down the railplug. The electromagnetic accelerating force causes the plasma to propagate down the rails of the railplug at high speed. The proposed invention describes a railplug with 8 separate rail guns per railplug. The current is provided by a capacitive discharge unit. The arc for each set of rails will sweep through the fuel mixture within the railplug, igniting it. These large flames, which originate near the center of the railplug and radiate outwardly, will quickly ignite the remaining fuel mixture. Ignition at a fixed optimum angle before Top Dead Center (TDC) regardless of engine speed (within operating limits) is possible because the piston of a scotch yoke has a slower rate of change near TDC than the slider piston, and the global ignition by the railplugs will quickly ignite all the fuel.

The rail fuel injectors also use the electromagnetic principles described above to force the fuel into each cylinder. The fuel is first forced into the rail fuel injector by pressure from a fuel pump through a small orifice to regulate the amount of fuel. At the proper time, electrical current from a capacitive discharge unit is provided to force the fuel into the cylinder and mix it with air. This must be done without ionizing the fuel to such a state that the fuel pre-ignites.

The preferred embodiment describes all of the components above, but may be modified without limiting the intent of the invention. This invention uses conventional materials and methods of processing familiar to those involved in the art of building engines, therefore no specific instructions shall be given in those matters.

BRIEF DESCRIPTION OF THE DRAWINGS

For a better understanding of the invention, reference is made to the following detailed description of the preferred embodiment in conjunction with the accompanying drawings, in which:

FIG. 5 is an elevational view of the scotch yoke shuttle, along with a main power piston and a smaller secondary exhaust control piston.

FIG. 6 is an elevational end view of an exhaust control piston with its clip to provide some friction against the scotch yoke shuttle to limit its travel.

FIG. 7 is a side elevational view of an exhaust control piston with its clip and connecting rod.

FIG. 15 is an elevational view of one of the ignition transformers showing the primary and secondary windings. There are eight ignition transformers per ignition transformer assembly. There is one ignition transformer assembly for each railplug.

FIG. 16 is an exploded perspective view of an ignition transformer.

FIG. 17 is a perspective view of a toroidal disk Ferro magnetic core for each ignition transformer.

DESCRIPTION OF THE PREFERRED EMBODIMENT

Figure 1:
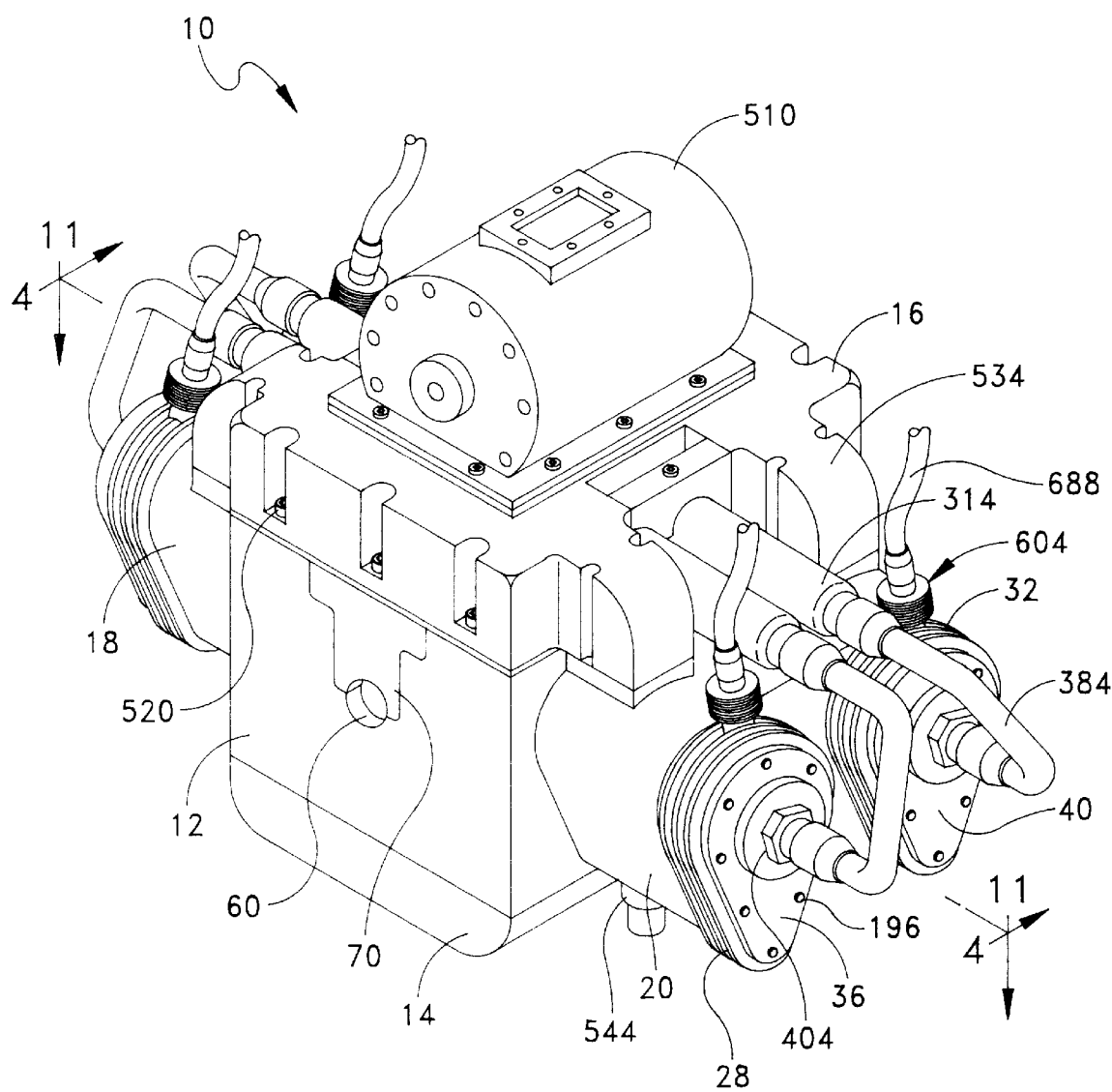
FIG. 1 is an overall perspective view of the engine showing many of the components.

FIG. 1 illustrates a perspective view of an engine constructed as described by the present invention. The engine is basically symmetrical when considered front to back or left to right, therefore a description of one cylinder will apply to the other three. Engine 10 has an engine block 12, which is integrally connected to horizontally opposed cylinder blocks 18 and 20. An oil pan 14 is provided. Each cylinder block, which has cooling flanges such as 28 and 32 to dissipate heat, contains two main power pistons and two secondary exhaust control pistons. The head of each cylinder, such as 36 or 40, is bolted to its cylinder by bolts 196. The main bearings, 60 is shown, receive the main bearing journals which are not shown, and may employ bearing inserts, surface treatment, etc., but for clarity and simplicity are also not shown. The end walls, such as 70, is detachable to permit the insertion of the crankshaft, which is not shown. A supercharger 510 is used and discharges into air plenum 16, which provides pressurized air to the cylinders via plenum extensions 534 over the intake ports for scavenging the exhaust gases through exhaust ports and exhaust pipes 544, and recharges each cylinder with oxygen for the next ignition. Air plenum 16 is secured to engine block 12 by bolts 520. This embodiment does not use a carburetor; the engine speed is controlled by the fuel quantity, which is supplied under pressure by fuel pump to rail fuel injectors 604 via fuel lines 688. Each cylinder is provided an ignition transformer assembly 314, which provides eight individual current sources through ignition cable 384 to railplug 404.

Figure 2:
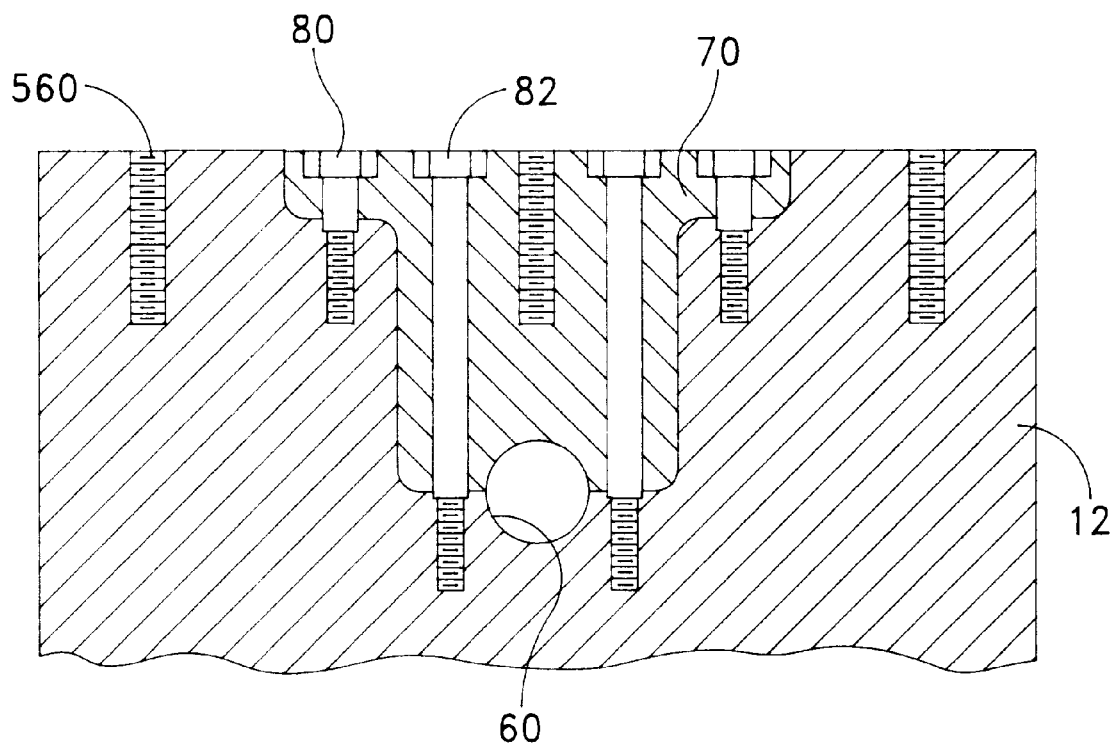
FIG. 2 is an elevational view of an end wall of the engine.

FIG. 2 is an elevational view of engine block 12 with main bearing 60. It contains partition 70, which is removable to permit the positioning of the crankshaft. Partition 70 is secured to engine block 12 with long bolts 82 and shorter bolts 80. Threaded holes 560 allow plenum 16 to be bolted to engine block 12 by bolts 520 in FIG. 1.

Figure 3A:
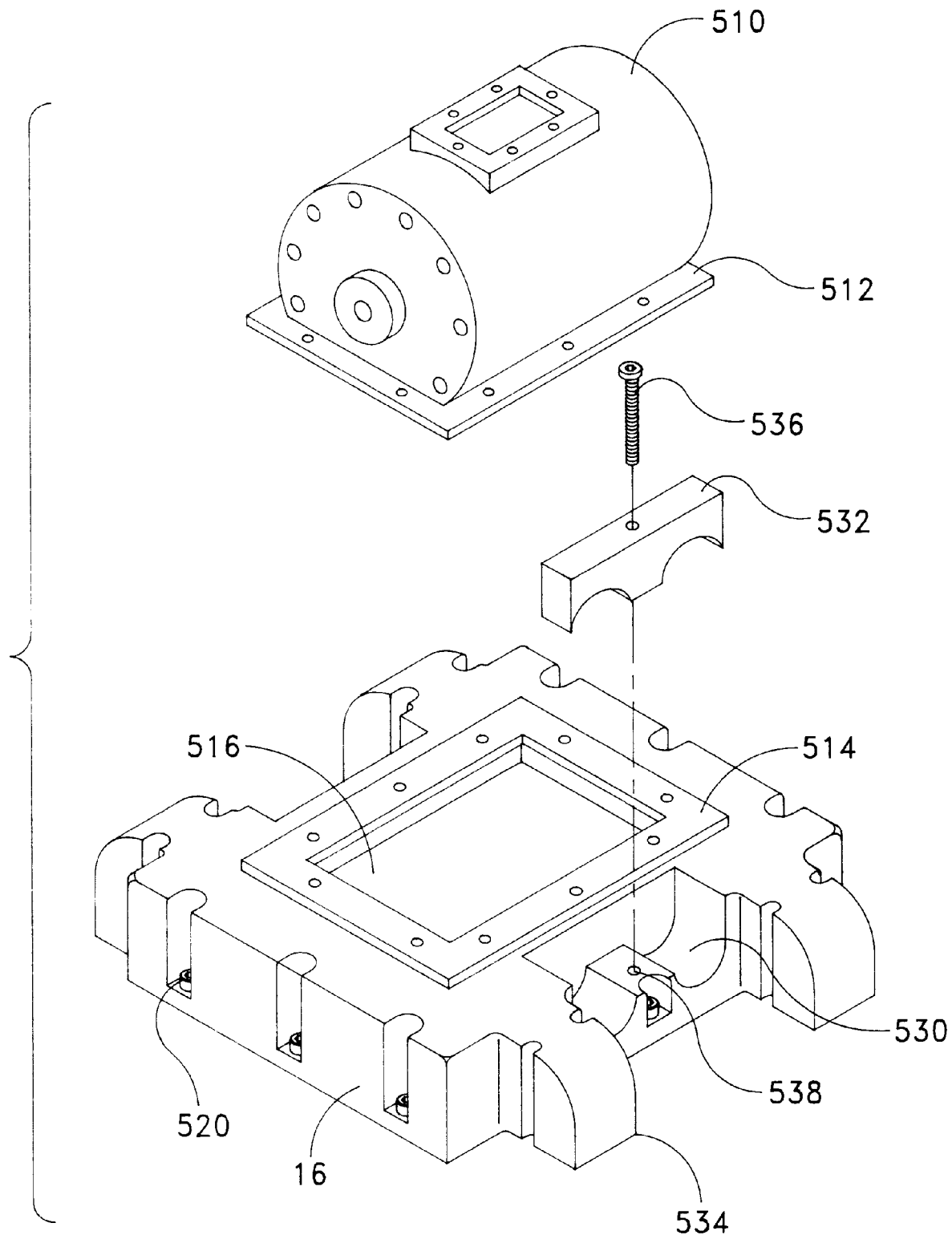
FIG. 3A is an exploded perspective view of the upper parts of FIG. 1.

FIG. 3A is an exploded perspective view of the upper parts of FIG. 1. Supercharger 510 provides pressurized air into air cavity 516 of plenum 16. Supercharge 510 base 512 is secured to base plate 514 with bolts. Plenum 16 is secured to engine block 12 of FIG. 3B by bolts 520 through threaded holes 560 of FIG. 3B. Plenum 16 provides pressurized air through plenum extensions 534 to cylinder blocks 18 and 20 of FIG. 3B, for scavenging the exhaust gases. Plenum depressions 530 are to secure the ignition transformer assemblies, by placing a bracket 532 over two transformer assemblies 314 in FIG. 1, and turning a bolt 536 into threaded hole 538, to fasten the bracket to plenum 16.

Figure 3B:
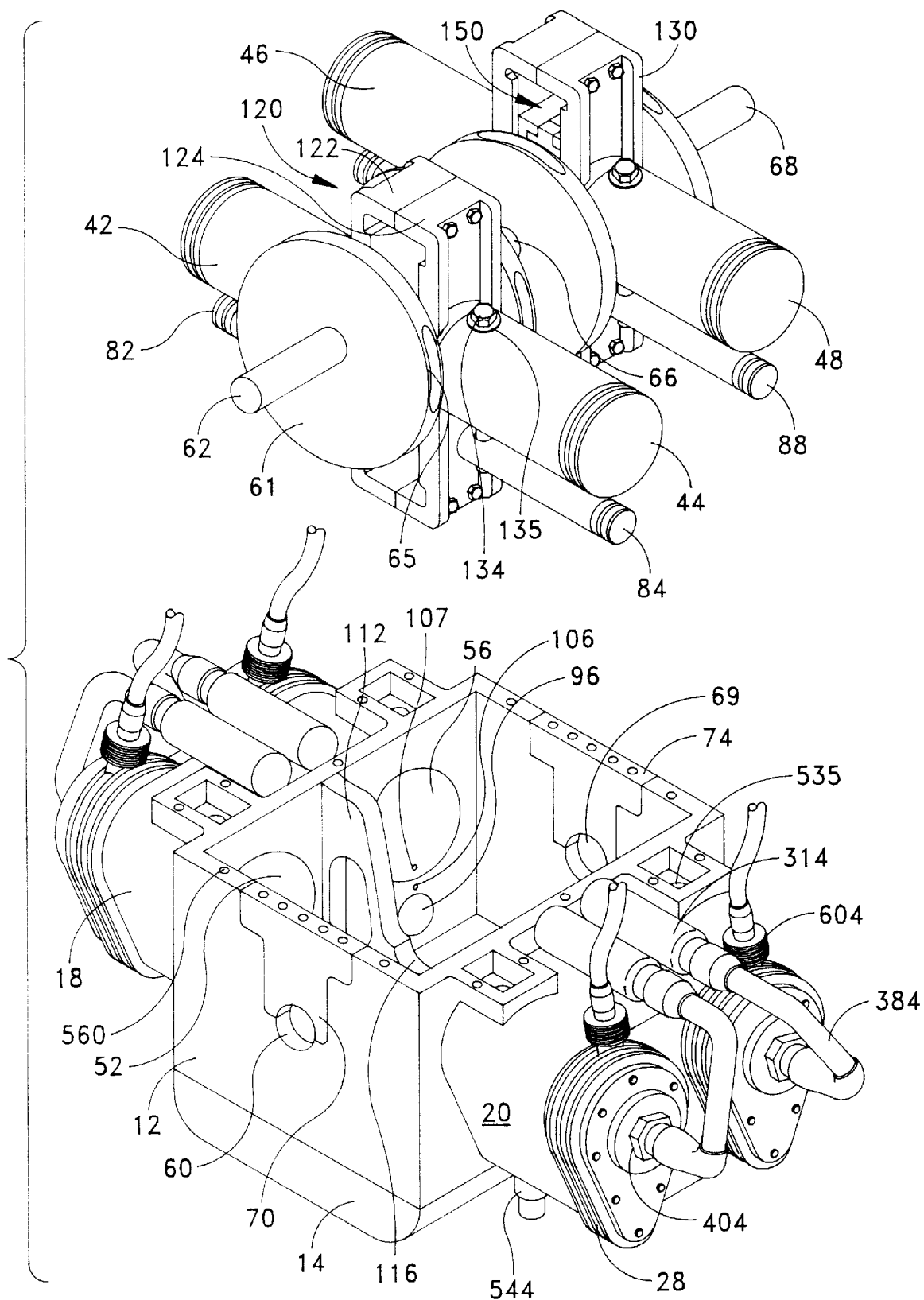
FIG. 3B is an exploded perspective view of the lower parts of FIG. 1.

FIG. 3B is an exploded perspective view of the lower parts of FIG. 1. Engine block 12 is integral to horizontally opposed cylinder blocks 18 and 20. Oil pan 14 is attached to engine block 12. The openings for main cylinders 52 and 56 and exhaust control cylinder 96 are shown for cylinder block 18. Main bearings 60, 116 and 69 receive main bearing journals 62, 66 and 68. Removable partitions 70 and 74 provide access for the insertion of the crankshaft. One of the engine oil inlets 106 is seen beside cylinder 56. The oil can be supplied by tubing, or some other more commonly used method as practiced in the art. Oil outlet 107 is in cylinder 56, to provide lubrication for piston 46 and its rings, and cylinder 56. Reinforcing member 112 is part of the central partition that contains main bearing 116, and helps strengthen the outer walls of engine block 12. The other reinforcing member is not shown on this drawing. Rail fuel injector 604 is shown connected between cooling flanges 28. Ignition transformer assembly 314 is held in place as shown in FIG. 3A. Transformer assembly 314 provides 8 separate current sources through ignition cable 384 to railplug 404, which contains 8 sets of rails. The capacitive discharge power supply, which is not shown on this drawing, provides electrical energy through power cable 384 for the primaries of transformer assembly 314. The crankshaft contains main bearing journals 62, 66, and 68, along with two crank pins, which are not shown. These crankpins support sliding blocks 150, that are bolted around the crankpins and allow the crankpins to spin freely within them. Scotch yoke 120 is composed of half shuttle sections 122 and 124 which are bolted together around sliding block 150. Reinforcing ribs 130 strengthen sections 122 and 124. Each sliding block 150 slides within its scotch yoke shuttle 120 to convert the linear motion of pistons 42, 44, 46 and 48 to rotary motion of the crankpins and crankshaft. The pistons are attached to the yoke by bolts 134 and washer 135. An unthreaded portion of bolt 134 extends below piston 44 to pass through exhaust control piston 84, which also maintains the scotch yoke 120 in vertical alignment. Exhaust control pistons 82 and 88 are also identified. Piston 84 has some vertical movement along bolt 134 to allow for heat expansion of the engine. The crankshaft contains counter weights 61 to provide inertial energy between ignitions and cavities 65, to help compensate for the mass of sliding blocks 150 and the crankpins. The counter weights are disks and cavities 65 may be covered to provide a smooth surface to help reduce windage resistance during use. Similarly, the pistons are cylindrically shaped up to the yoke to reduce windage resistance during use. Plenum 16 of FIG. 3A is secured by bolts into threaded holes 560. Plenum 16 provides pressurized air through intake ports 535 of cylinder blocks 18 and 20. The pressurized air scavenges the exhaust gases out through exhaust pipes 544.

Figure 4:
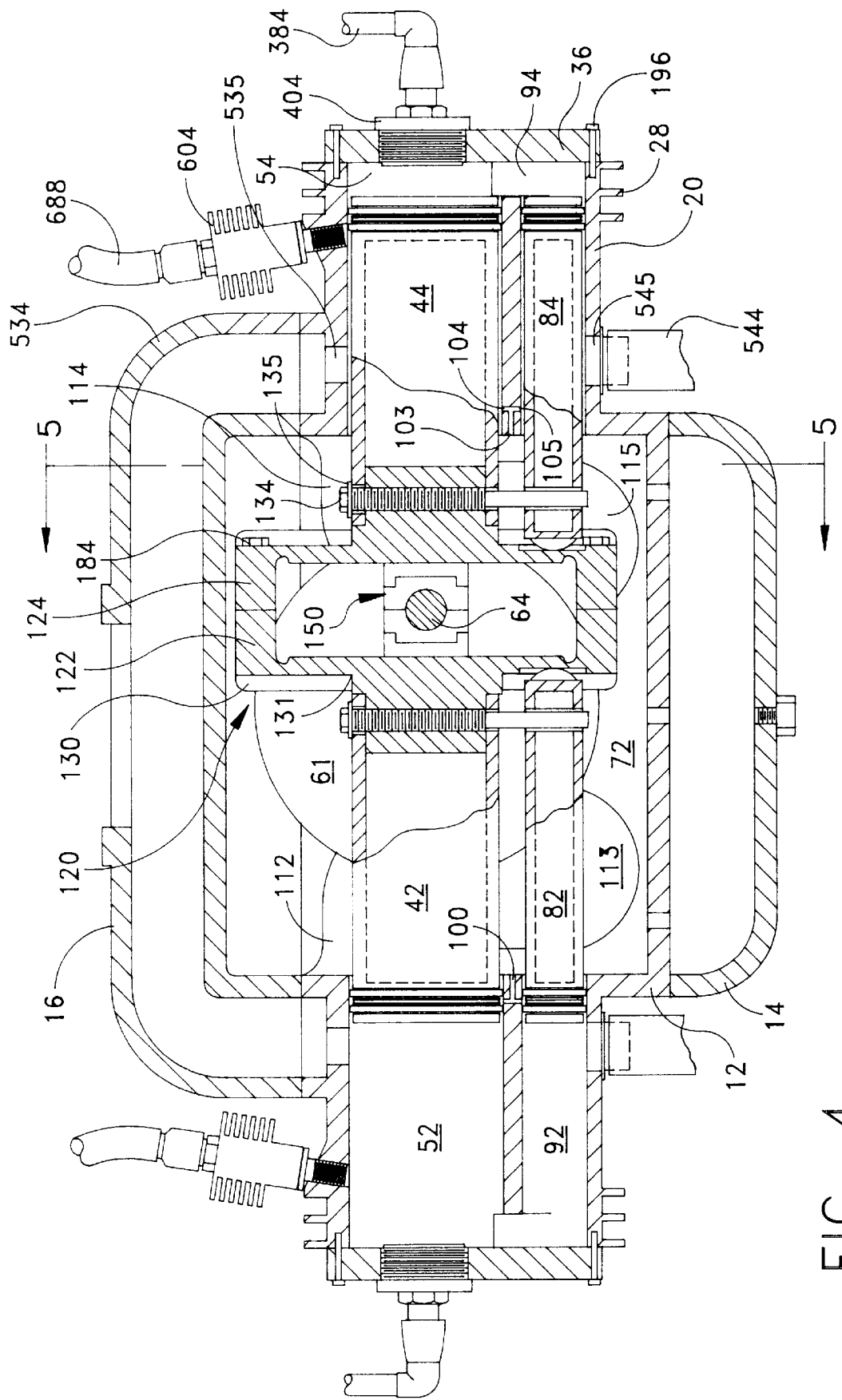
FIG. 4 is a sectional view along line 4 in FIG. 1. The side view shows the engine with its pistons, scotch yoke, sliding block, rail spark plugs and rail fuel injectors.

FIG. 4 is a side sectional view along line 4 of FIG. 1. Engine block 12 has oil pan 14 below and air plenum 16 above. The engine is symmetrical left and right, therefore the right half shall primarily be described. Right cylinder block 20 is integral to engine block 12, and has cooling flanges 28. Main pistons 42 and 44 are identical and slide within cylinders 52 and 54 respectively. Exhaust control pistons 82 and 84 are identical and slide within cylinders 92 and 94 respectively. Exhaust control pistons 82 and 84 also maintain scotch yoke 120 in vertical alignment. Piston 44 is a hollow cylindrical piston that is butted against right half shuttle section 124 of scotch yoke 120. Piston 44 is fastened securely to shuttle section 124 by bolt 134 and washer 135. At the lower extremity of bolt 134 is exhaust control piston 84. Between pistons 42 and 82 is lubricating oil inlet 100, between 44 and 84 is lubricating oil inlet 103 (both similar to 106 of FIG. 3B). Oil inlet 103 branches into outlet 104 for the main power piston and 105 for the exhaust control piston. Pressurized oil lubricates pistons 44 and 84 by being forced around the rings and oil groove when pistons 44 and 84 are near Bottom Dead Center (BDC). As pistons 44 and 84 move linearly within cylinders 54 and 94 respectively, they lubricate the walls of each cylinder and themselves.

Scotch yoke shuttle 120 is composed of two similar halves, 122 and 124 bolted together by bolts 184. Section 122 has threaded holes to receive bolts 184. Angle 131 in this preferred embodiment is a right angle, (piston 44 is at TDC when the crankshaft is at zero degrees) but it is infinitely variable and other angles could be used to alter the relationship between the crankpin position and Top Dead Center of piston 42 and 44. For example, if angle 131 is 15 degrees less the 90 degrees, or 75 degrees, and assuming the crankshaft is rotating counter clockwise, then when the crankshaft has turned to 15 degrees, piston 44 will be at TDC. This would alter the cycle dynamics, but also increase piston 42 and 44 side loading on cylinder 52 and 54 respectively.

Between the shuttle walls is sliding block 150, which is around crankpin 64. Crankpin 64 is connected to crankshaft counter weights 61. Reinforcing members 112 and 114 extending from central partition 72, help strengthen the engine block and hold the central main bearing which is not shown. Open sections 113 and 115 reduce weight and provide some access to the pistons. The length of the openings within shuttle 120, above or below sliding block 150 is greater than the radius of travel of crankpin 64.

Plenum extension 534 is connected to intake port 535, which is opened and closed as piston 44 moves within cylinder 54. Exhaust port 545 is connected to exhaust pipe 544 and is opened and closed as exhaust control piston 84 moves within cylinder 94. Cylinder 54 is in communication with cylinder 94 near cylinder head 36, so that exhaust gases will be scavenged from cylinder 54, through cylinder 94, and out through exhaust port 545 and into exhaust pipe 544. Rail fuel injector 604 is fed by fuel line 688. Head 36 is bolted to cylinder block 20 with bolts 196. It contains railplug 404, which is powered via ignition cable 384.

The engine has many similarities with other two stroke cycle engines. It works as follows starting shortly before TDC. Railplug 404 discharges and globally ignites the fuel in cylinder 54, which may be completely burned shortly before or after TDC, depending on engine speed. The expanding gases drive main piston 44, exhaust control piston 84 and scotch yoke shuttle 120, pushing them to the left. Assume that the crankshaft spins counter clockwise. Shuttle 120 pushes on sliding block 150, moving the sliding block and crankpin 64 to the left, but also moving them upward along the shuttle walls. These two perpendicular components of motion translate linear motion of the pistons to rotary motion of the crankshaft. Exhaust control piston 84 is moving along with piston 44, and eventually exposes exhaust port 545, ending the power stroke and starting the exhaust phase. Exhaust gases rush out of cylinder 54, into cylinder 94 and through exhaust port 545, into exhaust pipe 544, reducing the internal pressure to nearly atmospheric. Shortly afterwards, piston 44 exposes intake port 535, starting the intake phase and supplying supercharged air from plenum extension 534, into cylinder 54 and cylinder 94, scavenging them of exhaust gases out through cylinder 94 and exhaust port 545. The rings and oil groove are lubricated with oil from outlets 104 and 105 near BDC. As pistons 44 and 84 move to the right, piston 44 closes intake port 535, and shortly afterwards piston 84 closes exhaust port 545 and the compression phase begins. Rail fuel injector 604 is supplied energy from the rail fuel injector capacitive discharge power supply. This rail fuel injector injects the fuel (which was supplied through fuel line 688 and has been accumulating in injector 604 since the last discharge) into cylinder 54, where it mixes with air. Pistons 44 and 84 continue to compress the mixture, and shortly before TDC, railplug 404 again fires, completing the cycle.

FIG. 5 is an elevational front view of scotch yoke 120. Shuttle section 124 is bolted to the rear shuttle section with bolts 184, and has two reinforcing members 130 for extra strength. Shuttle section ridges 126 help maintain the scotch yoke 120 in vertical alignment by restraining the travel of sliding block 150 in FIG. 4. Piston 44 sits on shuttle stub 154. Piston 44 is hollow to reduce its mass. Bolt 134 and washer 135 secure piston 44 to shuttle stub 154. Below piston 44 is exhaust control piston 84, which is hollow, and is also connected to shuttle section 124 by the lower unthreaded portion of bolt 134. Piston 84 can move vertically, to compensate for heat expansion. Crankpin 64 is behind shuttle section 124.

FIG. 6 is an elevational view of the back end 85 of exhaust control piston 84. Clip 86 is attached and will provide some resistance to movement by pressing against the shuttle.

FIG. 7 is an elevational side view of exhaust control piston 84 and clip 86. Clip 86 touches shuttle 124 and resists movement by friction, but will allow slight movement along bolt 134 through hole 145 to compensate for heat expansion of the engine. Clip 86 is attached by inserting the clip's two pegs 87 in drilled holes on the back end 85 of piston 84.

Figure 8:
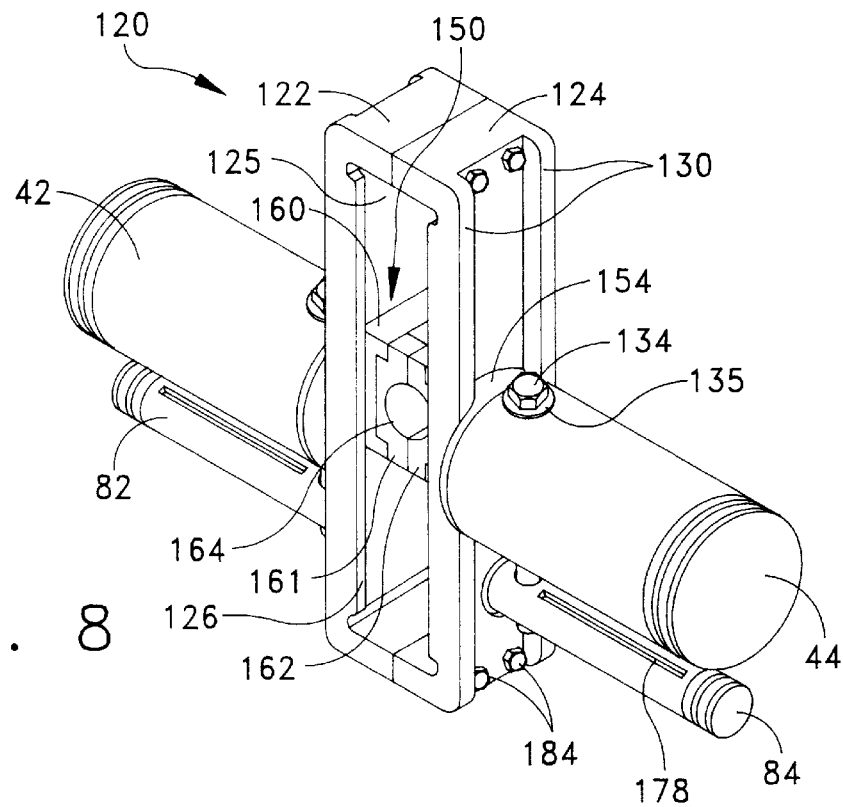
FIG. 8 is a perspective view of a scotch yoke, two main power pistons, two secondary exhaust control pistons.
Figure 12:
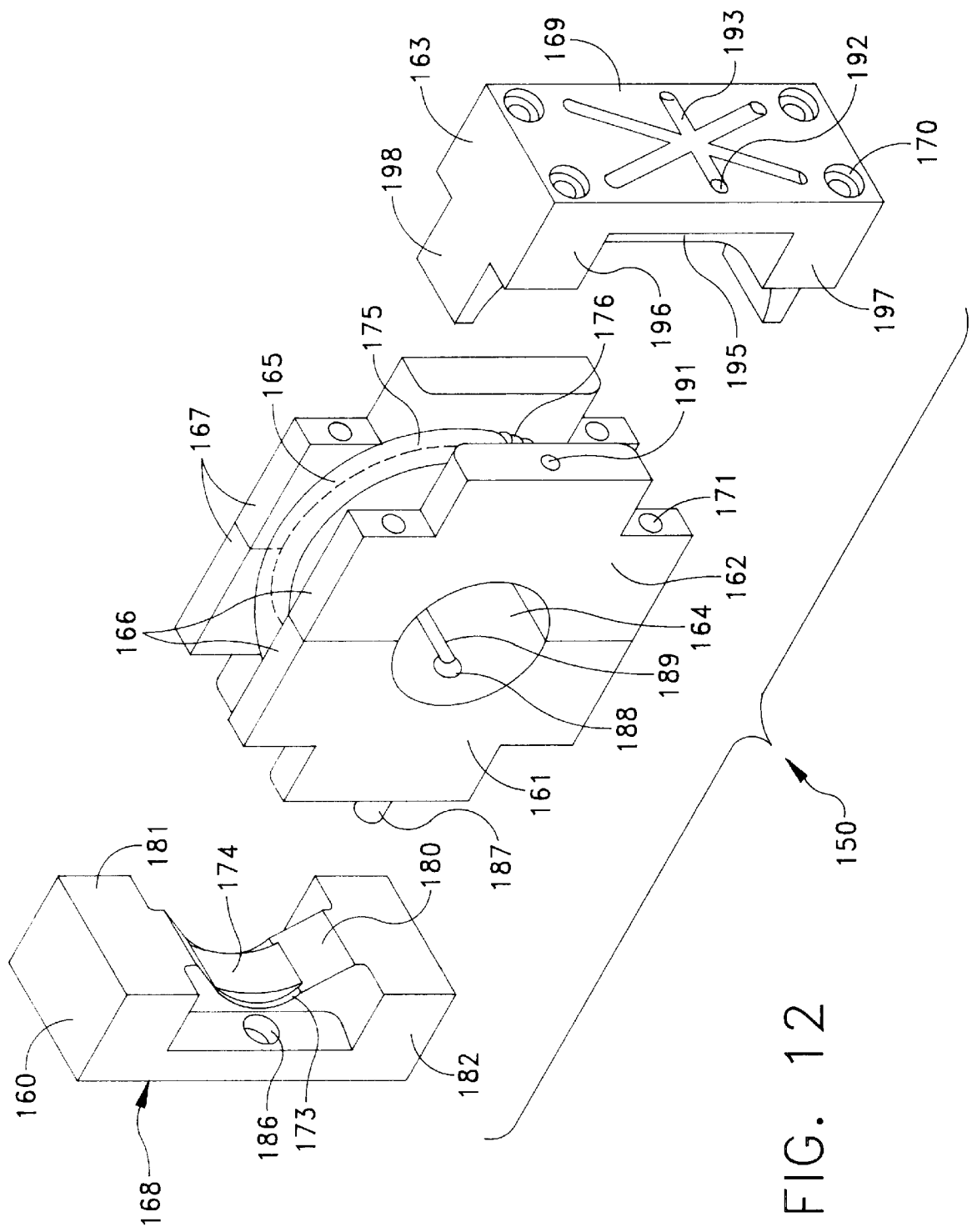
FIG. 12 is an exploded view of the self adjusting sliding block.

FIG. 8 is a perspective view and illustrates scotch yoke 120 with shuttle sections 122 and 124 bolted together with bolts 184. Both shuttle sections have reinforcing ribs 130. Sliding block 150 is made of sliding block sections 160, 161, 162, which are shown, and sliding block section 163 which is not shown on this drawing, but is shown in FIG. 12. Sliding block 150 moves along shuttle interior surface 125, and is restrained by shuttle ridges 126. These components may be treated for durability as practiced in the art. Sliding block left middle section 161, and right middle section 162, form bearing 164 for a crankpin. Sliding block left section 160, slides against shuttle surface 125. Shuttle section 122 has main piston 42 and exhaust control piston 82. Similarly, shuttle section 124 has main piston 44 attached to shuttle stub 154 by bolt 134 and washer 135. Below is exhaust control piston 84, which is allowed to move vertically along the lower portion of bolt 134 to compensate for the engine's heat expansion. Each piston has channels 178, to release excess engine lubricating oil into the engine crankcase.

Figure 9:
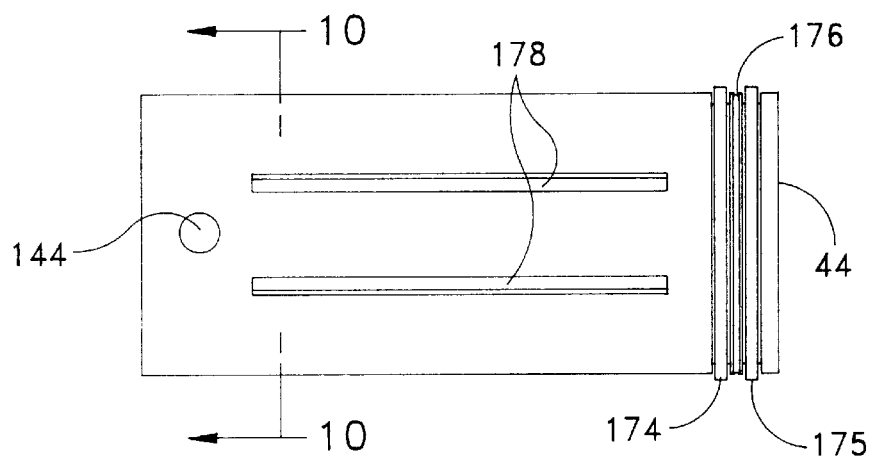
FIG. 9 is an elevational view of the lower section of a main power piston showing the rings, oil groove and two oil release channels.

FIG. 9 is an elevational view of the lower section of main piston 44 and is applicable to exhaust control piston 84. Hole 144 is for bolt 134, which secures piston 44 to shuttle stub 154 of shuttle section 124. Two rings, 174 and 175 are shown, but others may be added as practiced in the art. Oil groove 176 receives lubricating oil (from oil outlet 104 in FIG. 4) and lubricates the cylinder wall, which then lubricates the piston surface. Channels 178 release excess oil from outlet 104 into the engine.

Figure 10:
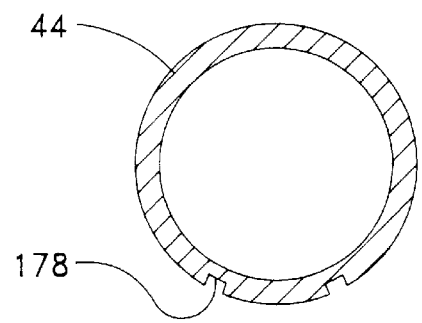
FIG. 10 is a cross sectional view of a piston as shown in FIG. 9.

FIG. 10 is a cross sectional view for FIG. 9 along 10. Piston 44 wall is shown with oil release channels 178 cut into the wall.

Figure 11:
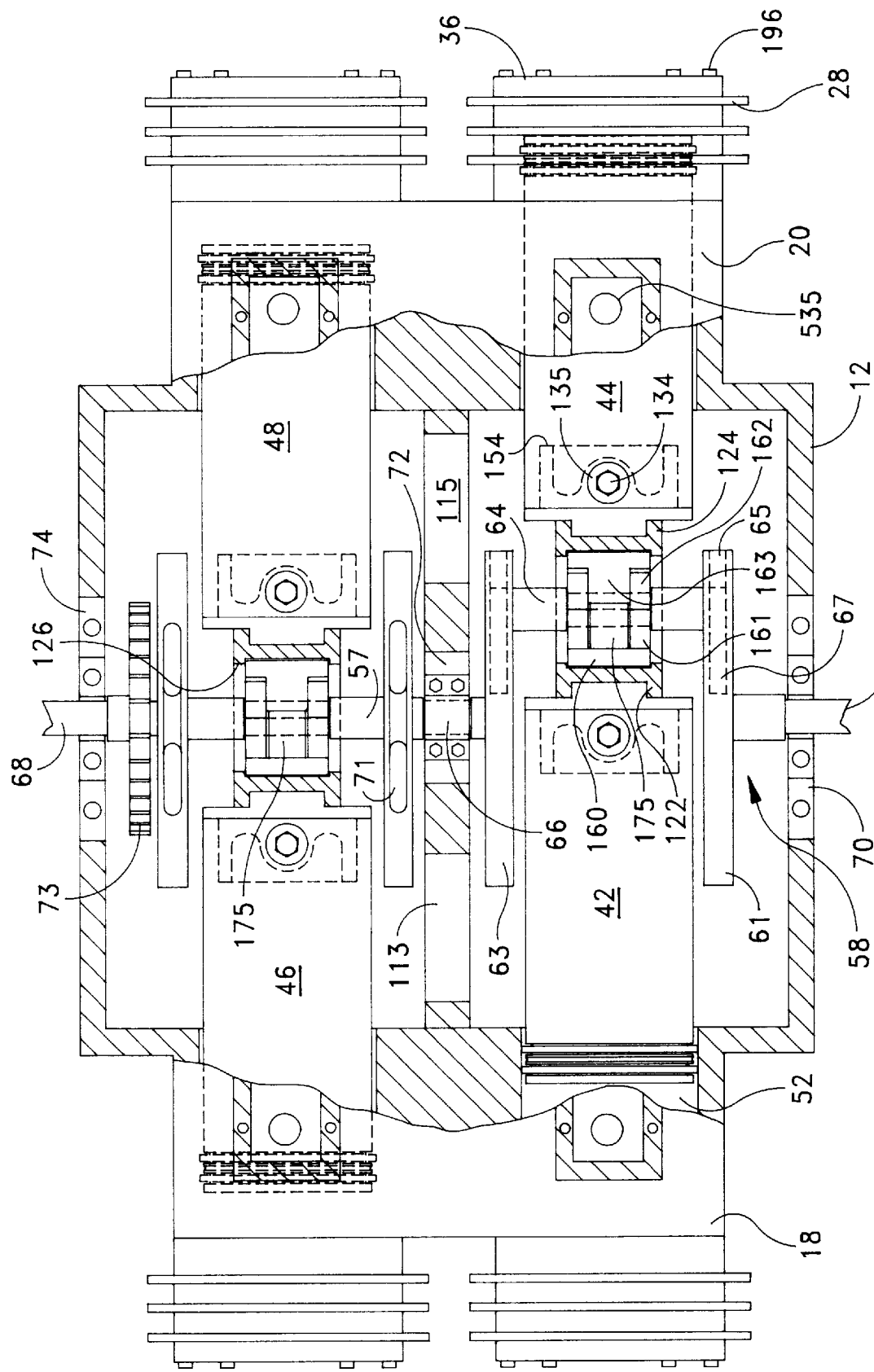
FIG. 11 is a cross sectional view of the engine along line 11 in FIG. 1. The top view shows the engine with its cylinders, pistons, crank shaft, scotch yokes and sliding blocks.

FIG. 11 is a cross sectional view of the engine looking down along line 11 in FIG. 1. Engine block 12 is integral to cylinder blocks 18 and 20. Each cylinder has intake port 535, cooling flanges 28, head 36 and head gasket, which is not shown. Head 36 is attached to cylinder block 20 by bolts 196. The railplugs and rail fuel injectors are not shown. Crankshaft 58 has journals 62 and 68 and central journal 66. Removable sections 70 and 74 allow for the insertion of crankshaft 58. The crankshaft's four counter weights, such as 61 and 63, are disks to reduce air movement and also act as flywheels. Each counter weight has opening 71, which extends to a depth of cavity 65 above crankpin 64 and to a depth of cavity 67 around crankpin 64. These cavities compensate for the mass of crankpin 64, and sliding block sections 160, 161, 162, and 163. Sliding block tapered partial ring 175 will push sliding block section 160 to the left, to remove undesired clearance between the sliding block and shuttle. Crankpin 64 is between counter weights 61 and 63 and fits inside sliding block sections 161 and 162, which are allowed to spin freely. Each shuttle is made of shuttle sections 122 and 124, which are bolted around sliding block sections 160, 161, 162, and 163 and provides for the conversion of linear to rotary motion. Piston 44 is slid over shuttle stub 154 and secured by bolt 134 and washer 135. Pistons 42, 46 and 48 are similarly connected. Central partition 72 has openings 113 and 115 to reduce weight. Upper crankpin 57 is 90 degrees out of phase with lower crankpin 64 so that each cylinder fires singularly for smoother power generation. Wheel 73 contains cogs and may be used to drive an oil pump, etc.

FIG. 12 is an exploded perspective view of self adjusting sliding block 150. Each sliding block has four sections, 160, 161, 162, and 163. Left middle section 161 butts up against right middle section 162, forming a bearing opening 164 for a crankpin. These two sections form front wall section 166 and back wall section 167, with a coaxial central journal 165 between the two walls. A tapered partial ring 175 turns on journal 165, and is driven by coiled spring 176. Right section 163 has a vertical central extension 195, upper horizontal extension 196, and lower horizontal extension 197. Right section 163 also has extensions 198, which fit over partial tapered ring 175 and coiled spring 176, to hold them in place. Right section 163 mates with section 162, and is restrained from moving. Left middle section 161, right middle section 162, and right section 163 are securely fastened together by bolts in counter sunk holes 170, through hole 171 in section 162; and turned into threaded holes in section 161. Left sliding block section 160 has vertical central extension 180, upper horizontal extension 181, and lower horizontal extension 182 that mate with left middle section 161. Vertical central extension 180 has depression 173 and mating partial disk 174. Tapered partial ring 175 slides against partial disk 174, and drives left section 160 away from section 161 to remove excess clearance between the shuttle and sliding block. Bearing 164 and sliding surfaces 168 and 169 are treated for wear resistance as practiced in the art. Oil channel 189 on bearing 164 collects lubricating oil from a crankpin, and supplies the lubricating oil through hole 188, through tube 187, into hole 186, finally into oil channels on surface 168, for lubricating sliding block surface 168 and the shuttle surface upon which it slides. Surface 168 has oil channels similar to 193 on surface 169, but are not shown. An oil channel similar to 189 in bearing 164 also collects lubricating oil and supplies it through hole 191, through hole 192, to lubricating oil channels 193 on sliding block surface 169, to lubricate surface 169, and also the shuttle surface upon which it slides.

Figure 13:
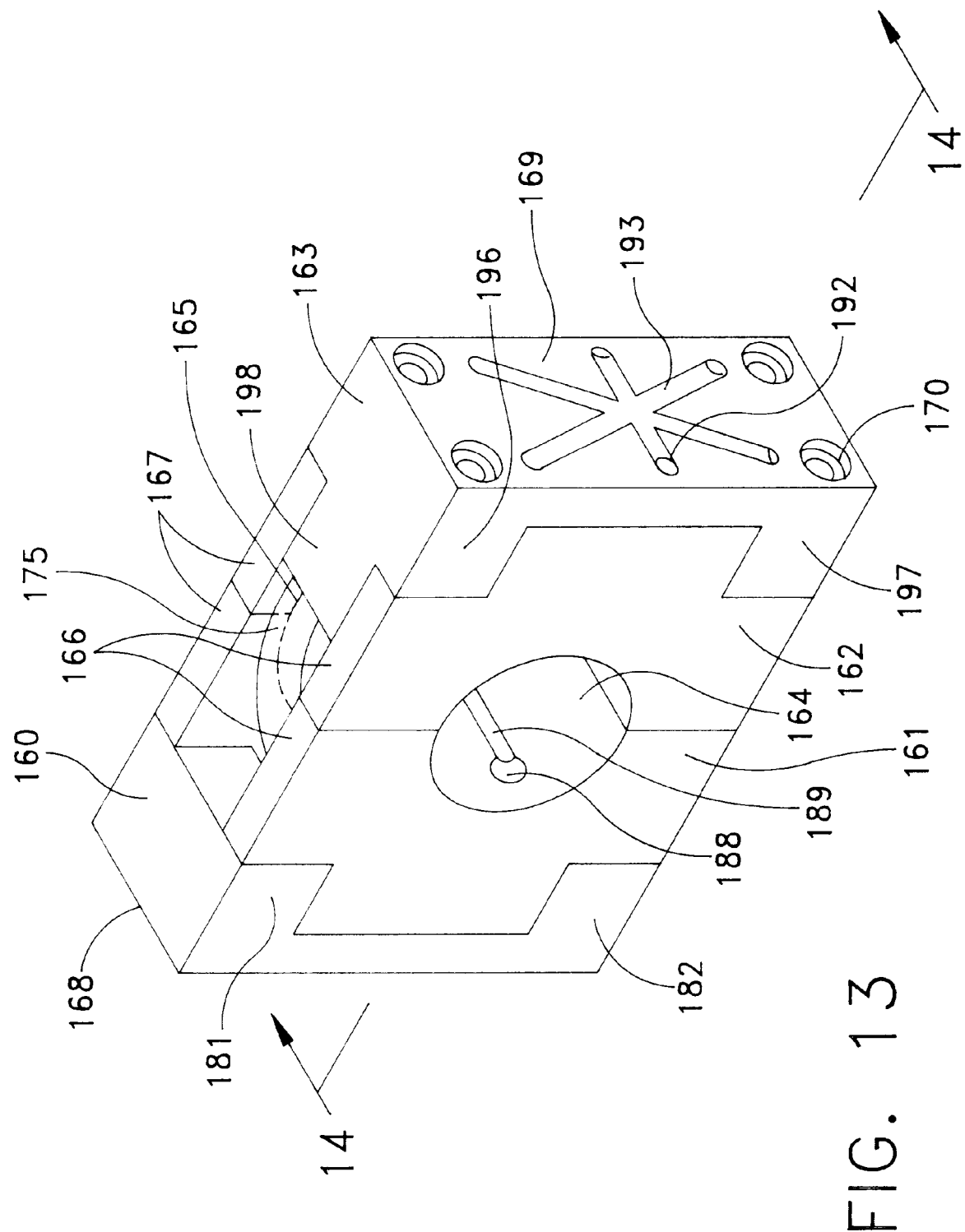
FIG. 13 is a perspective view of a self adjusting sliding block.

FIG. 13 is a perspective view of a self adjusting sliding block 150 in FIG. 12, with the pieces mated together. The sliding block is comprised of four sections, 160, 161, 162, and 163. Left middle section 161 and right middle section 162 form bearing 164, which is placed around a crankpin, which is not shown, and are rigidly fastened to right section 163 by bolts which are not shown. The bolts enter countersunk holes 170, pass through right middle section 162, and are turned into treaded holes in left middle section 161. Left section 160 has horizontal extensions 181 and 182 that mate with left middle section 161, and restrain movement, except movement that is perpendicular to its crankpin axis, and away from section 161. Similarly horizontal extensions 196 and 197 on right section 163, mate with right middle section 162, and restrain movement. Front wall section 166 and back wall section 167 contain central coaxial journal 165, and tapered partial ring 175 that turns on journal 165. Extension 198 of right section 163 maintains tapered partial ring 175 in place, along with a compressed spring, which is not shown in this drawing. Tapered partial ring 175 will turn slightly to drive left section 160 away from left middle section 161, to reduce clearance between the sliding block and shuttle to acceptable limits. A crankpin supplies lubricating oil as practiced in the art, into lateral oil channel 189 and into hole 188, which passes through a tub in left middle section 161, and through left section 160, to lubricate sliding block surface 168 and its shuttle surface. This oil also flows through sections 162 and 163, through hole 192 and into channels 193, to lubricate right surface 169 and the shuttle surface it slides upon.

Figure 14:
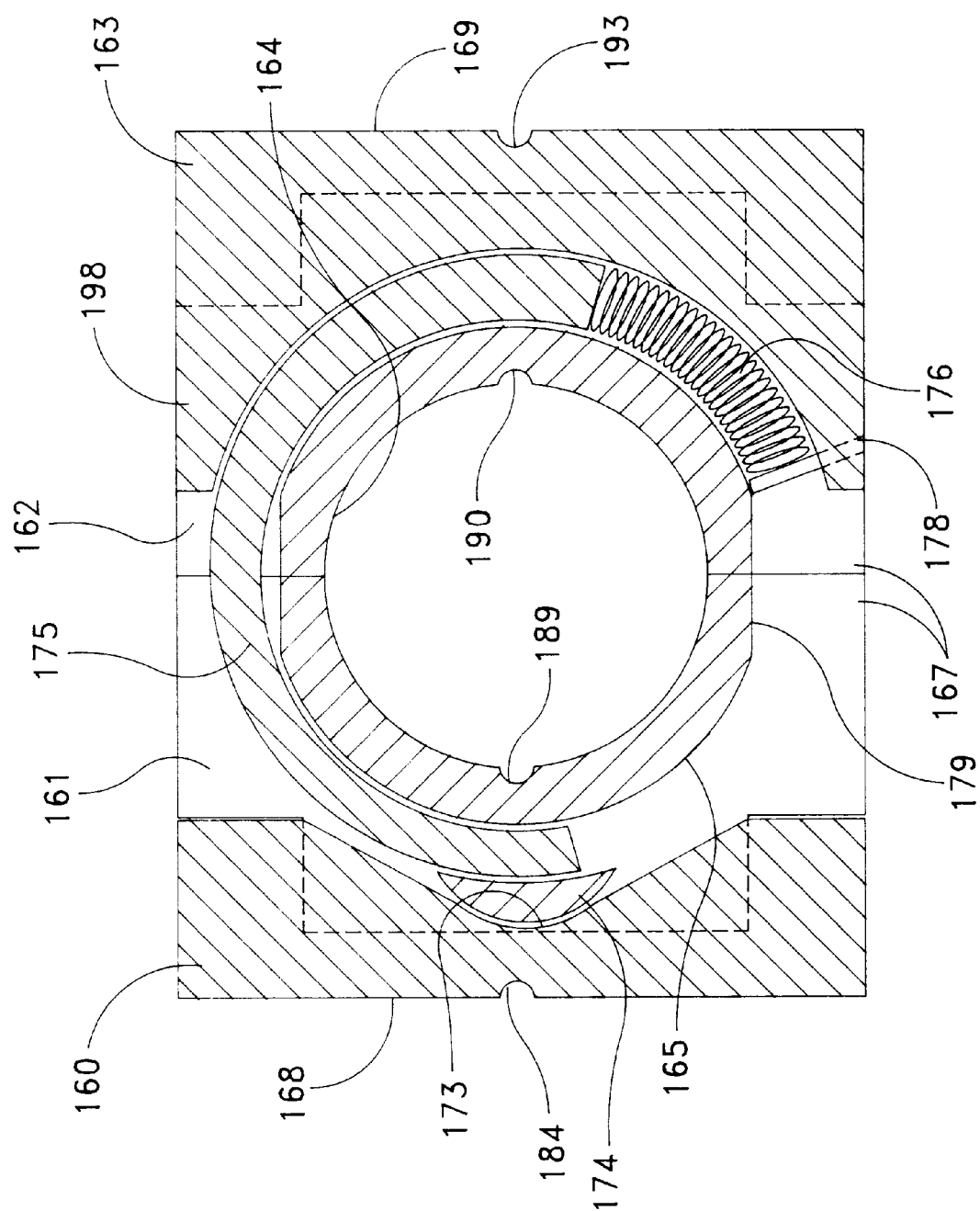
FIG. 14 is a cross sectional view of the self adjusting sliding block in FIG. 13 along line 14.

FIG. 14 is a cross sectional view of a self-adjusting sliding block in FIG. 13 along line 14. There are four main sections, left section 160, left middle section 161, right middle section 162, and right section 163. Sections 161 and 162 form bearing 164, which is placed around a crankpin that is not shown. Sections 161 and 162 also form back wall section 167, and journal 165, upon which partial tapered ring 175 turns. Right section 163 mates with section 162, and it is securely fastened to sections 161 and 162 by bolts that are not shown. Left section 160 mates with section 161 and is permitted to slide away from section 161 in a line perpendicular to the axis for bearing 164 or journal 165. Two depressions 179 permit the insertion of tapered partial ring 175, which when turned from depressions 179, will secure itself to journal 165. Tapered partial ring 175 has a constant outer arc that has its axis transposed a small distance from the axis for journal 165, thus having a minimum thickness at the end against partial disk 174, and gradually increases in thickness to its maximum at the end abutting coiled spring 176. Slot 178 is on back wall 167, and also on the front wall which is not shown on this drawing, for the base of coiled spring 176, to prevent spring 176 from being ejected. Tapered partial ring 175 and coiled spring 176 are also maintained in position by extension 198 of right section 163. Partial disk 174 mates with depression 173 in left section 160, which permits partial disk 174 to pivot slightly, and to always mate with tapered partial ring 175. A crankpin, which is not shown, supplies lubricating oil as practiced in the art, into lateral channels 189 and 190, which lubricate the crankpin and bearing surface 164. This oil also flows through holes that are not shown on this drawing, into oil channels 184 to lubricate sliding block surface 168 and its shuttle surface, and into oil channels 193 to lubricate surface 169 and its shuttle surface. The sliding block will self-adjust when there is too much clearance between itself and the shuttle, caused by frictional wear. Coiled spring 176 will drive tapered partial ring 175, which will turn slightly, increasing its thickness between journal 165 and partial disk 174, pushing partial disk 174 against depression 173, which will push left section 160 away from left middle section 161 and reduce the clearance between the sliding block and shuttle to acceptable limits.

FIG. 15 is an elevational view of an ignition transformer 300 showing the primary and secondary windings toroidally wound around a dielectric bobbin and toroidal inner core, which is actually a disk with a hole through its center. It operates in a typical way, which is familiar to those working in the art. There are eight ignition transformers per ignition transformer assembly in this embodiment, but any reasonable number could be used. There is one ignition transformer assembly for each railplug. Ferro magnetic core 322 is encased in a dielectric bobbin which is composed of inner and upper bobbin section 326 and outer and lower bobbin section 324. These two bobbin sections fit firmly around core 322. Primary winding 330 is shown with 4 turns and is made of thicker wire to carry the high energizing current $i_p$, which produces an electromotive force (EMF). Secondary winding 332 may have 200 turns and is made of thinner wire because its current $i_s$ is much lower. Other turns ratios can be used. The EMF induces a secondary current $i_s$ in winding 332, which attempts to cancel any change in magnetic flux. Current is enters the secondary winding at 333 and exits at 334 but at a much higher voltage. This high voltage will be supplied via an ignition cable to one set of rails on a railplug for discharging and completing the high voltage circuit.

FIG. 16 is an exploded perspective view of a toroidal ignition transformer 300. The inner toroidal core 322 is encased by dielectric bobbin sections 326 and 324. It has a low voltage primary 330 and high voltage secondary 332. Its operation is familiar to those working in the art.

FIG. 17 is a perspective view of a toroidal Ferro magnetic core 322 for each ignition transformer. Core 322 is a disk with a hole through its center. It may be any appropriate material familiar to those working in the art for an efficient low impedance transformer. The dimensions for this embodiment are: outer diameter of 2 inches, inner diameter of 1 inch, and height of 0.3 inches. These dimensions provide a core volume of 0.7 cubic inches.

Figure 18:
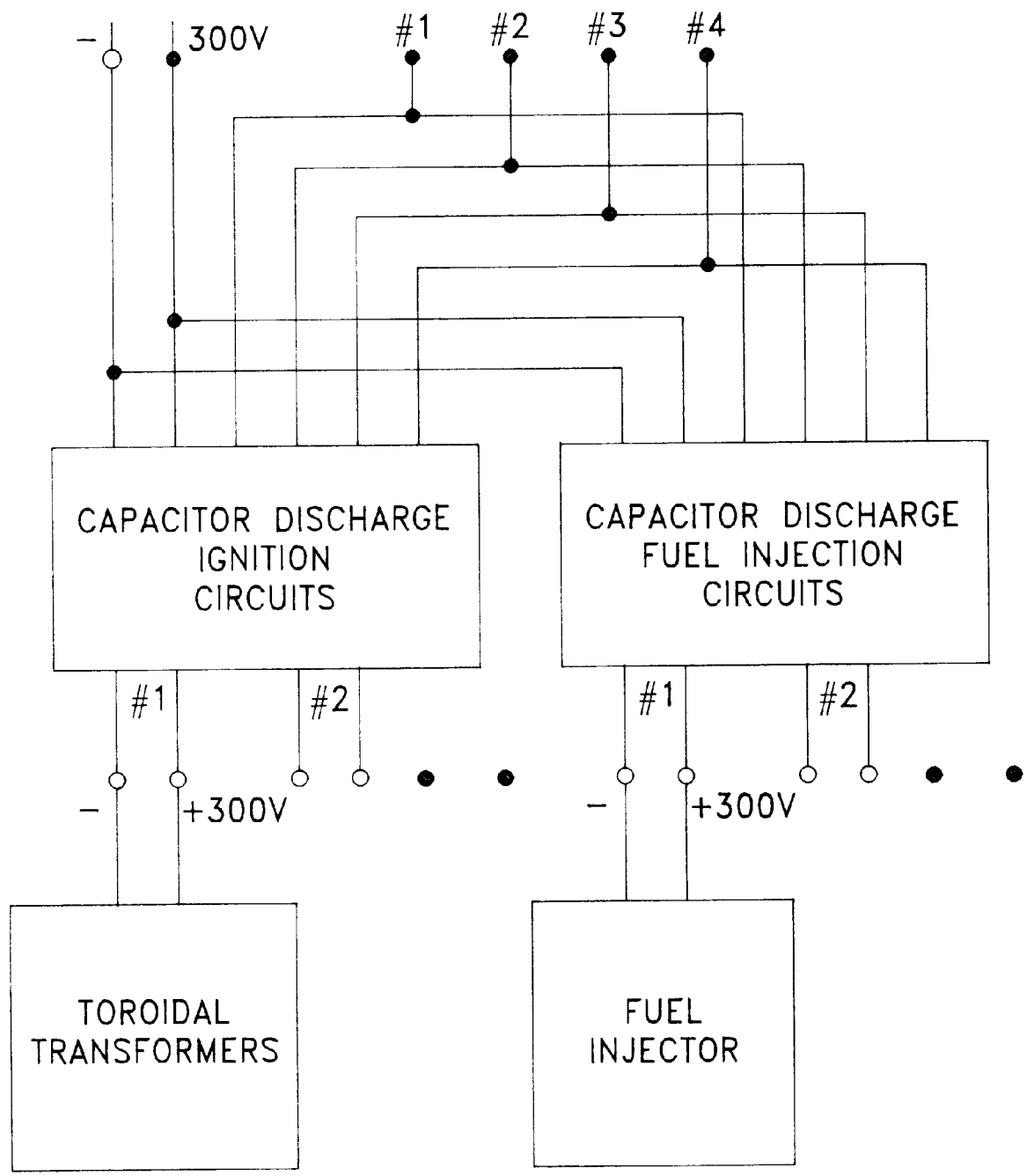
FIG. 18 is a block diagram of the capacitor discharge system.

FIG. 18 is a block diagram of the capacitor discharge system. This embodiment uses a 300 Volt power supply to charge the capacitor discharge ignition circuits and the capacitor discharge fuel injection circuits. Timing signals 1, 2, 3, and 4 (which refer to the firing order, not cylinder number) trigger their respective circuits for powering their appropriate toroidal transformers or appropriate fuel injector at approximately 300 Volts. Further explanation is in FIG. 19A and FIG. 19B.

Figure 19A:
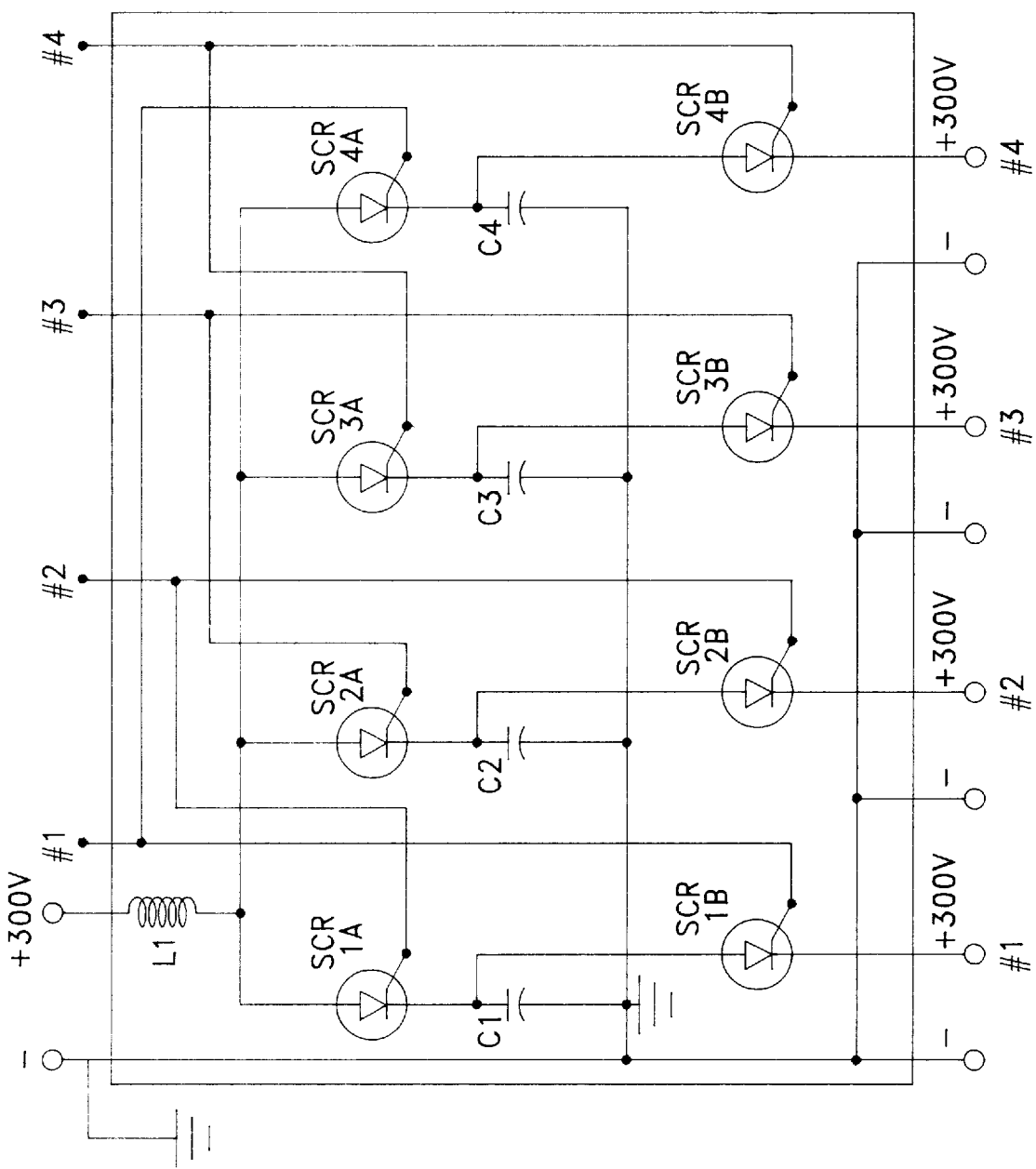
FIG. 19A is a schematic drawing of the capacitor discharge ignition circuits.

FIG. 19A is a schematic drawing of the capacitor discharge circuits used to energize the toroidal transformers for a 4 cylinder engine; it is for illustrative purposes and not intended to limit its applicability for other engines by merely modifying the number of it's circuits. The circuits for #1, #2, #3 and #4 are very similar, therefore the circuit for #1 shall primarily be described. Each trigger may have a series current limiting resistor, but it is not shown. The 300 Volt power supply is connected to inductor L1 which helps limit the charging current. The triggering signal for #2 discharges C2 through SCR2B, but also charges C1 through SCR1A, which will conduct while the current is greater than zero. When the current through SCR1A equals zero, it will turn off and not conduct. The triggering signal for #1 will turn on SCR1B, discharging C1 through SCR1B and energizing the ignition transformer assembly for #1. Triggering signal for #1 will also charge C4 through SCR4A. Each triggering signal therefore discharges its own capacitor and charges the just previously discharged capacitor. Trigger #1 discharges C1 and charges C4; trigger #2 discharges C2 and charges C1; trigger #3 discharges C3 and charges C2; and trigger #4 discharges C4 and charges C3. Component values may be determined by those familiar in the art.

Figure 19B:
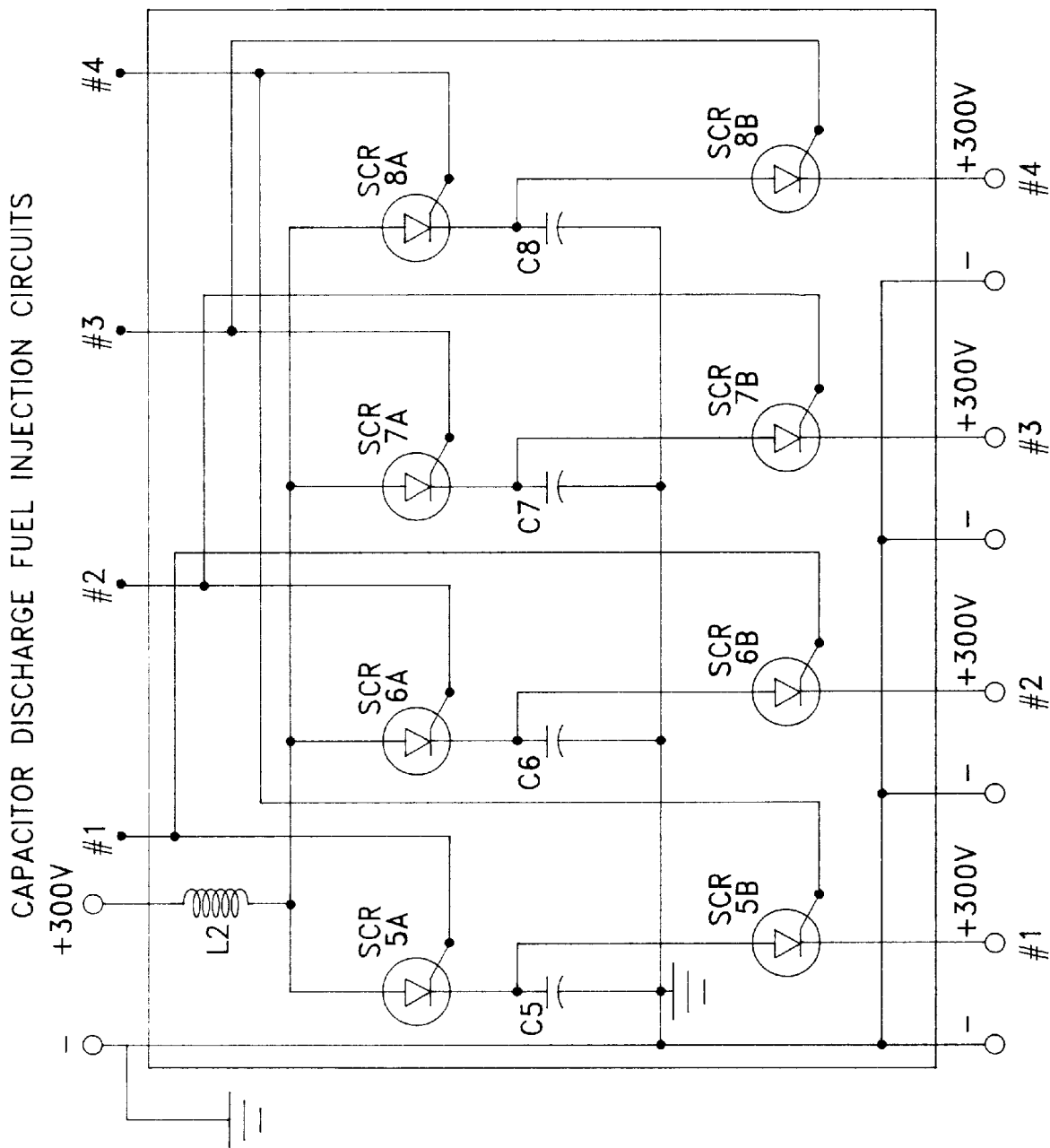
FIG. 19B is a schematic drawing of the capacitor discharge fuel injection circuits.

FIG. 19B is a schematic drawing of the capacitor discharge fuel injection circuits used to energize the rail fuel injectors for a 4 cylinder engine; it is for illustrative purposes and not intended to limit its applicability for other engines by merely modifying the number of it's circuits. The triggering signals that are used for the ignition circuits above are also used for discharging the fuel injection circuits. The circuits for #1, #2, #3 and #4 are very similar, therefore the circuit for #1 shall primarily be described. The 300 Volt power supply is connected to inductor L2 which helps limit the charging current. The triggering signal for #1 charges C5 through SCR5A, which will conduct while the current is greater than zero and also discharges C6 through SCR6B by triggering SCR6B. When the current through SCR5A equals zero, it will turn off and not conduct. The triggering signal for #4 will turn on SCR5B, discharging C5 through SCR5B and energizing the rail fuel injector for #1. Each triggering signal therefore charges its own capacitor and discharges the capacitor for the cylinder just ahead of it in firing order. Trigger #1 charges C5 and discharges C6; trigger #2 charges C6 and discharges C7; trigger #3 charges C7 and discharges C8; and trigger #4 charges C8 and discharges C5. Component values may be determined by those familiar in the art.

Figure 20:
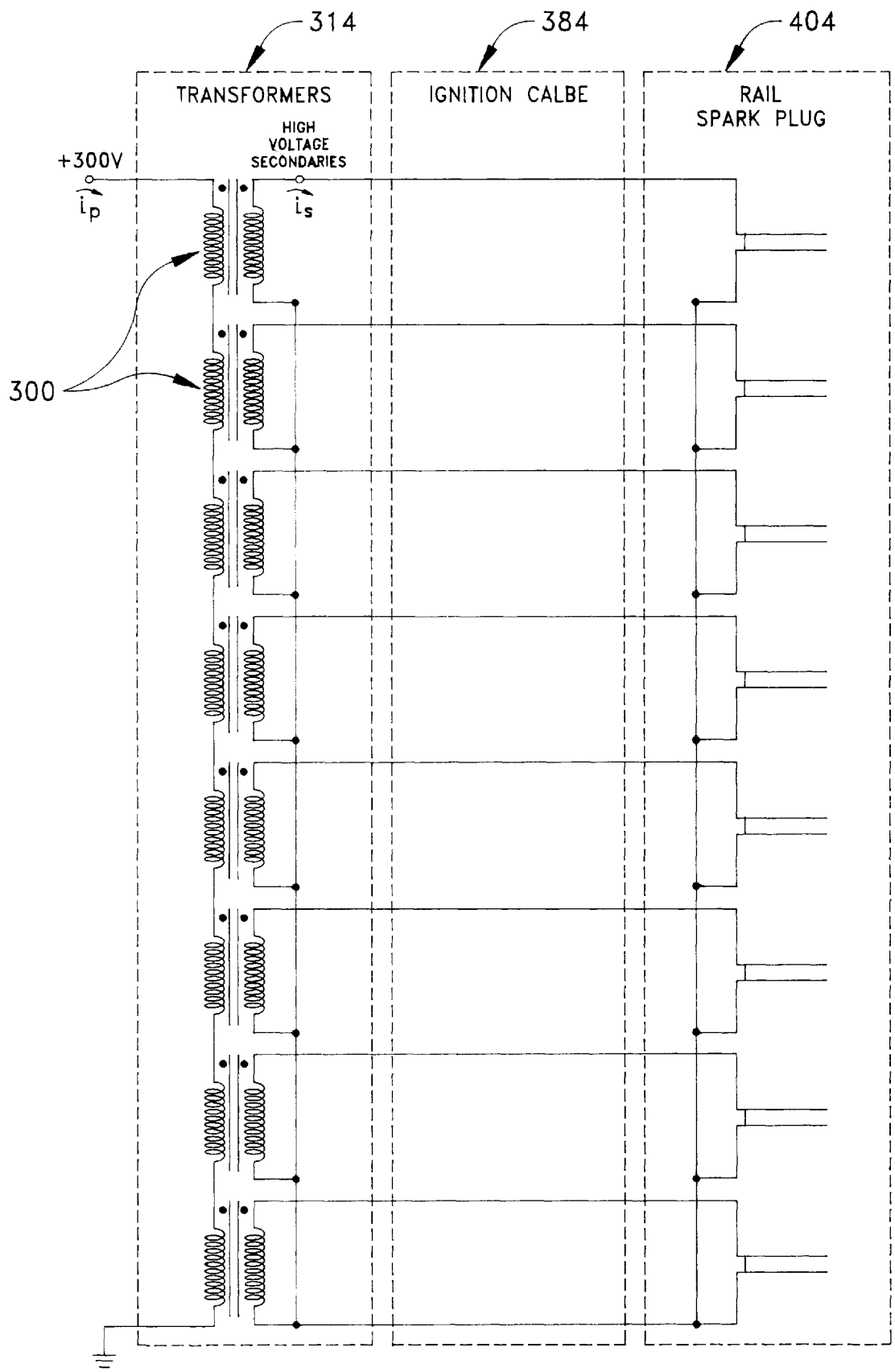
FIG. 20 is a block diagram of an ignition transformer assembly, ignition cable and railplug.

FIG. 20 is a block diagram of an ignition transformer assembly, ignition cable and railplug. There would be four of these circuits for a four cylinder engine. Ignition transformer assembly 314 contains eight toroidal transformers 300. The primaries of transformers 300 are in series, conducting current $i_p$ to ground. The 8 separate secondary windings and secondary currents $i_s$ are connected to their separate isolated rails with a return path through a common rail and common conductor that are isolated from ground and isolated from ground. The secondaries are connected to railplug 404 via ignition cable 384.

Figure 21:
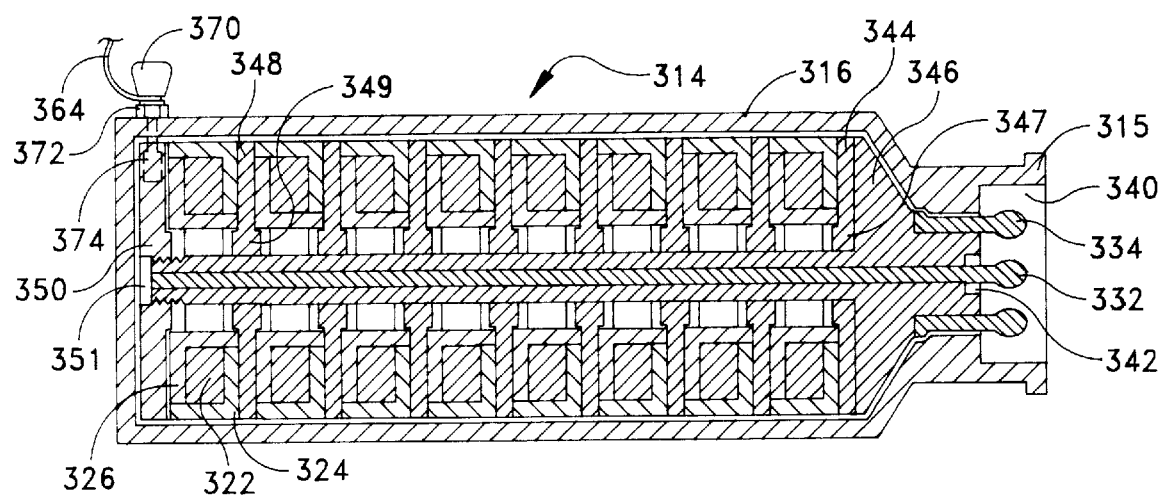
FIG. 21 is a cross sectional view of an ignition transformer assembly.

FIG. 21 is a cross sectional view of an ignition transformer assembly 314. It is shown with an end that receives an ignition cable connector as an option, but could be made integrally with the cable, and therefore is not intended to limit its application. Each toroidal core 322 is encased by bobbin sections 324 and 326. The primary and secondary, which are not shown, are toroidally wound around bobbin sections 324 and 326. Insulating disk 348 separates and aligns each transformer. Disk 348 has wider sections 349 that protrude into each bobbin's central hole. Insulating disk 344 has a wider section 347 on one side, the other is flat and acts like a washer for terminal section 346 which is turned into threaded hole 351 in insulating section 350 to secure all the transformers together. Each secondary has a connection to its own electrode 334. Each secondary also has a connection to common electrode 332 at threaded hole 351. Section 350 also has two terminals 372 for primary power from the capacitive discharge ignition circuits. Terminals 372 each have a base 374 that is embedded in 350. Power cables 364 are attached to 372 and secured by turning cap 370 onto it. The transformers are encased by insulating material 316, that forms a cylindrical covering and may seal insulating transformer oil if desired for additional insulation. Case 316 narrows at the cable end and has a ridge 315 to help secure the ignition cable. Opening 340 is for the removable ignition cable connector of FIG. 23 and FIG. 24. Indentation 342 is to further isolate central electrode 332.

Figure 22:
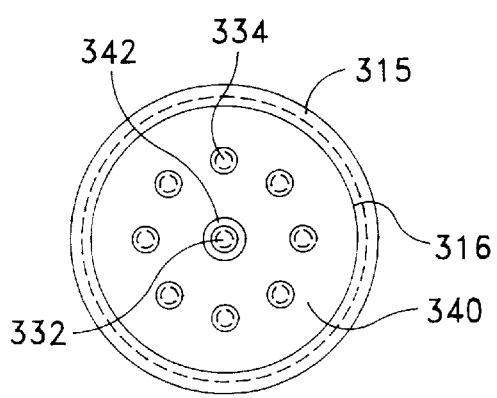
FIG. 22 is an elevational view of the cable end of an ignition transformer assembly of FIG. 21.

FIG. 22 is an elevational end view of the cable end of an ignition transformer assembly of FIG. 21. Casing 316 and ridge 315 provide opening 340 for the ignition cable connector. Electrodes 334 are radially placed around common central electrode 332. Indentation 342 is around central electrode 332 to further isolate it from the other electrodes.

Figure 23:
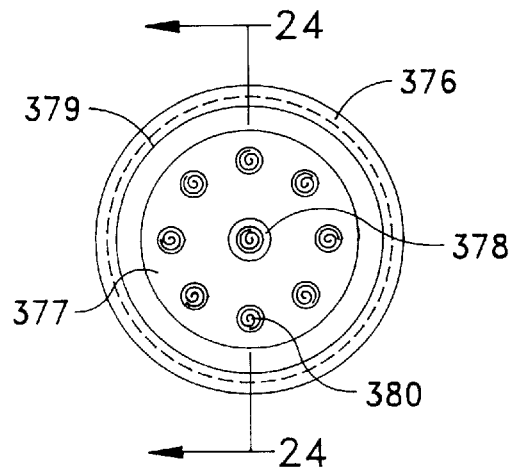
FIG. 23 is an elevational end view of an ignition cable connector that attaches to FIG. 22.

FIG. 23 is an elevational end view of an ignition cable connector that attaches to an ignition transformer assembly as shown in FIG. 21 or FIG. 22. Cable base 377 has openings for coiled springs 380, which make electrical connection to electrodes 332 or 334 of FIG. 21. Extension 378 slides into indentation 342 of FIG. 21. Casing 376 covers the cable connector and has indentation 379 to receive ridge 315 of FIG. 21.

Figure 24:
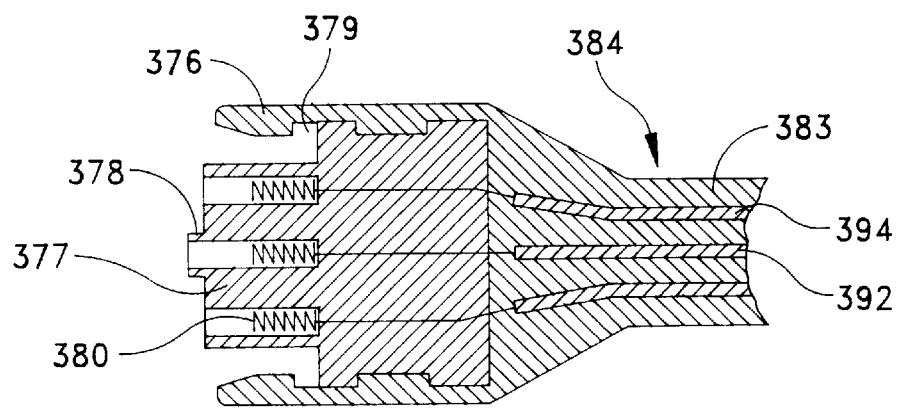
FIG. 24 is a cross sectional view as shown by line 24 in FIG. 23 of an ignition cable connector and cable.

FIG. 24 is a cross sectional view as shown by line 24 in FIG. 23 of an ignition cable connector that attaches to an ignition transformer assembly in FIG. 21 or FIG. 22. Cable connector base 377 has openings for coiled springs 380, which make electrical connection to electrodes 332 or 334. Extension 378 slides into indentation 342. Clip 376 slides over ridge 315 and onto the neck of the transformer assembly. The clip has an indentation 379 to receive ridge 315 and prevents it from becoming loose. Ignition cable 384 contains eight ignition conductors 394 and common conductor 392 which are encased by insulating material 383 and extends to the railplug connector as shown in FIG. 25.

Figure 25:
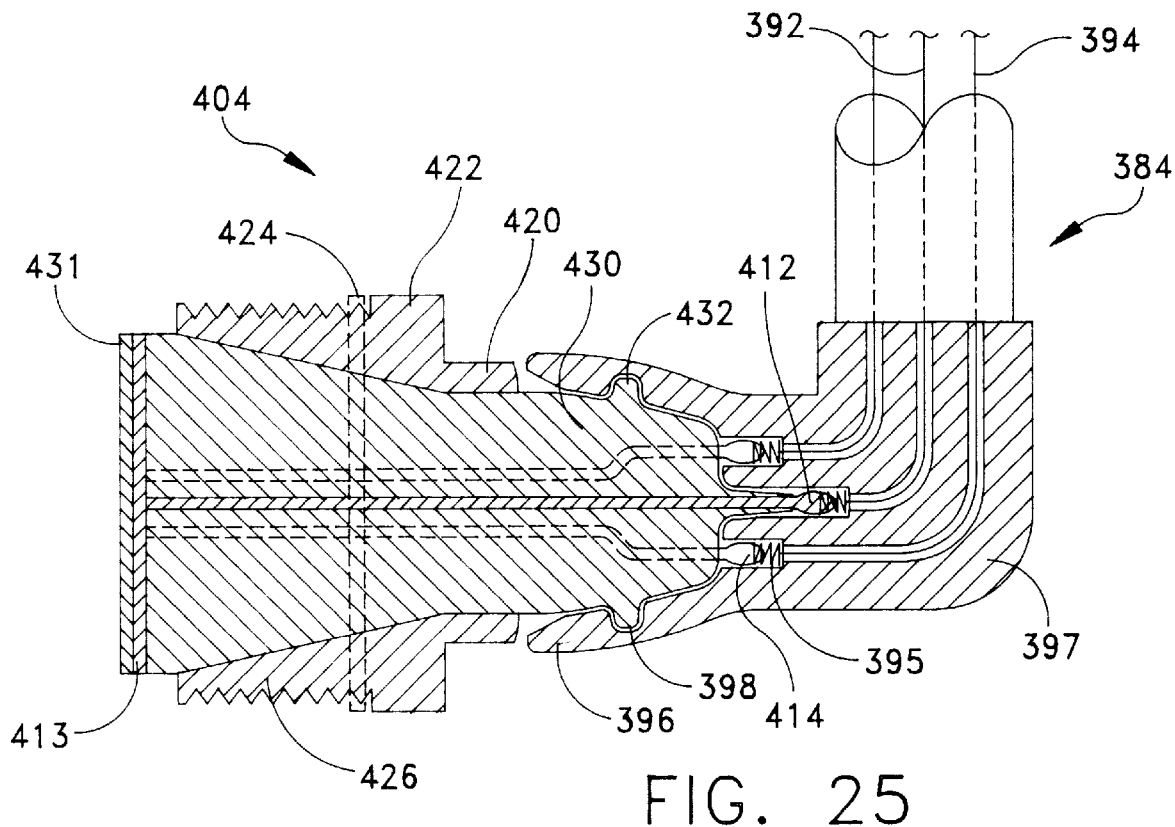
FIG. 25 is a cross sectional view of an ignition cable connector attached to a railplug.

FIG. 25 is a cross sectional view of an ignition cable connector attached to a railplug. Eight conductors 394 and common conductor 392 are insulated in cable 384, which is attached to railplug cable connector 397. The conductors 392 and 394 terminate on spring contacts 395, which press against railplug terminals 412 and 414 respectively. During ignition, the eight outer conductors 394 are temporarily at a high voltage relative to common conductor 392 and must be well insulated from it. Railplug connector 397 is attached to railplug 404 by sliding clip 396 over circumferential ridge 432 on ceramic insulator 430 into groove 398. Railplug 404 has ceramic insulating material 430, a metallic base 422 around insulator 430, a threaded end 426, washer 424 and hex nut 420 for attaching railplug 404 to the cylinder head. Common terminal 412 is positioned along the axis of railplug 404 and is connected to rail 413. Terminals 414 are positioned parallel and close to terminal 412, but not too close to breakdown the insulation and arc. Each terminal is connected to its own rail, which is not shown in this figure. Ceramic material 430 extends beyond the rails to 431.

Figure 26:
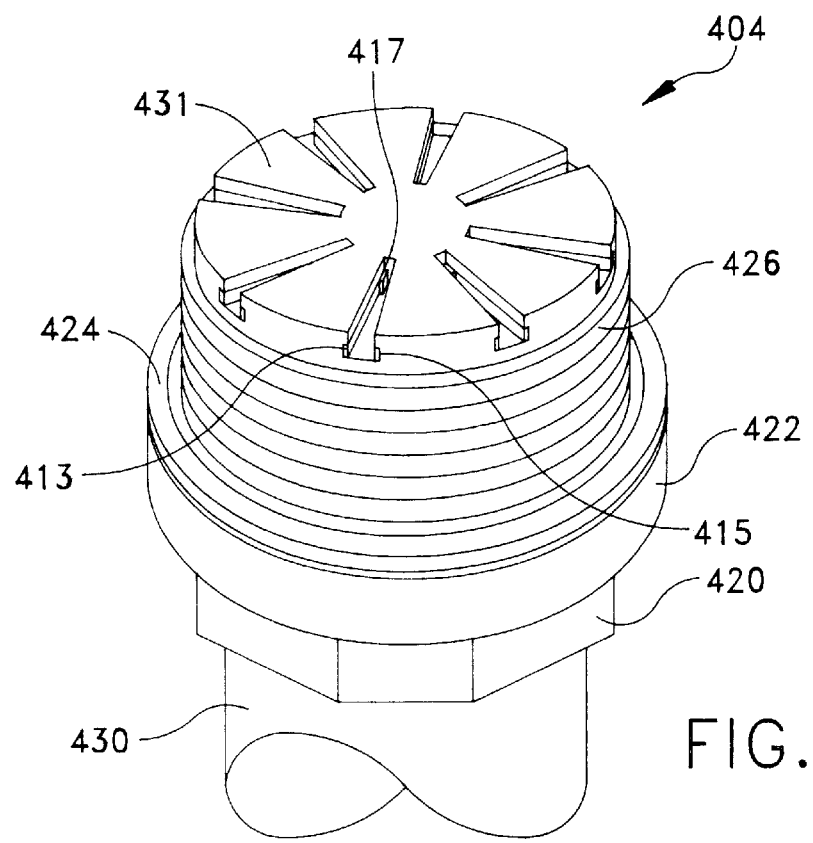
FIG. 26 is a partial perspective view of a railplug.

FIG. 26 is a partial perspective view of railplug 404. Railplug ceramic insulator 430 is below hex nut 420, metallic base 422, washer 424 and threads 426. The ceramic material extends to 431 and holds the rails 413 and 415 securely. Each rail may have a precious metal insert laser welded for better durability. There are eight sets of rails radially positioned along the top surface of railplug 404. Each set has one common rail 413, which is internally connected to all other rails 413 at the center of the railplug and connected to terminal 412 in FIG. 25. Each set also has rail 415, which extends radially toward the center in ceramic material 431 and is connected to its own terminal 414 in FIG. 25. There is an arc initiation protrusion 417 on each rail just beyond ceramic material 431 to reduce the space between the rails. An arc is initiated between the two protrusions 417, and travels along the air gap between rails 413 and 415. Each arc initiation protrusion may also have a precious metal insert laser welded for better durability. Referring to FIG. 25 and FIG. 26, the current will flow axially along terminal 414 to rail 415, then flow radially along rail 415, to protrusion 417, jump across 417 to the other protrusion 417, then again flow radially along 413 to the center toward terminal 412, then travel axially along 412. The magnetic field that is produced when the current is moving radially along rails 413 and 415 will produce a Lorentz force that forces the arc to travel radially outward along the rails. The 8 arcs will ignite the fuel and air, and produce global ignition.

Figure 27:
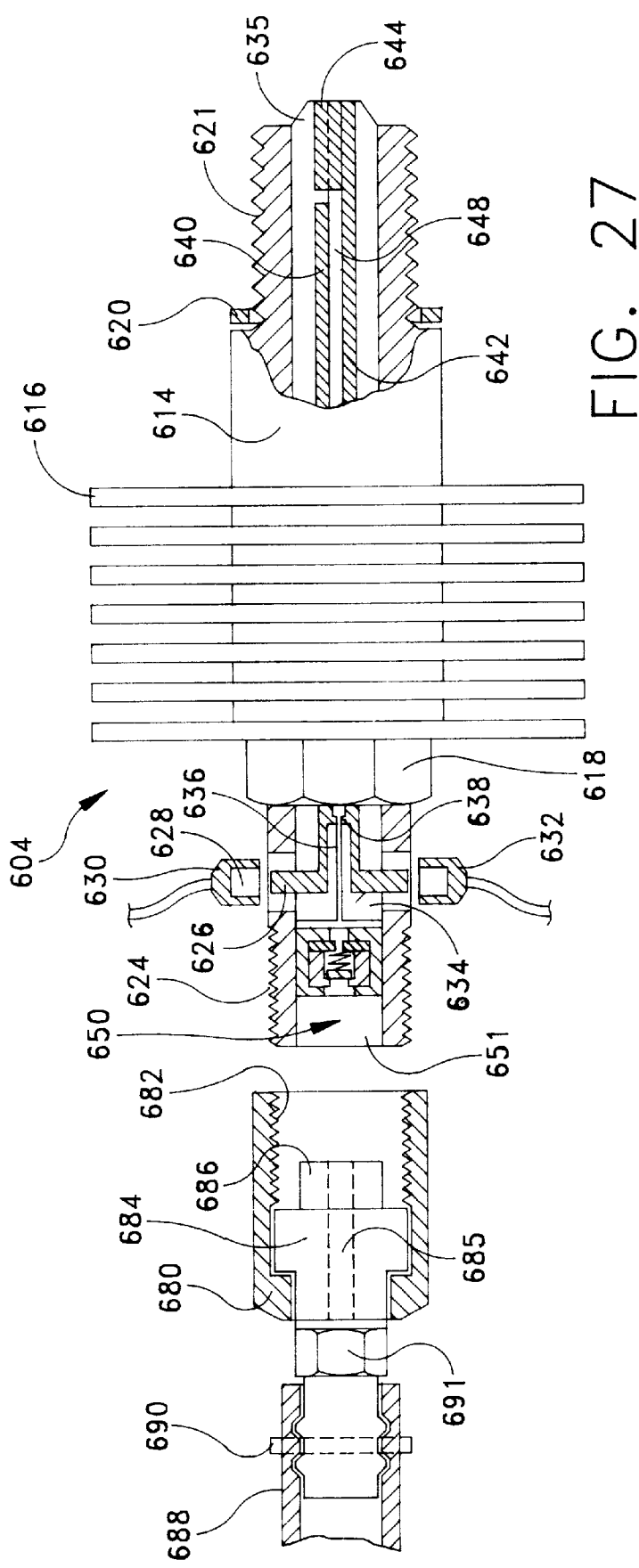
FIG. 27 is a cross sectional view of a rail fuel injector.
Figure 27A:
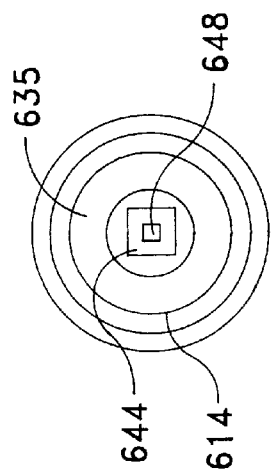
FIG. 27A is an elevational front view of the rail fuel injector in FIG. 27.

FIG. 27 is a cross sectional view of a rail fuel injector 604. It has a metallic body 614, cooling flanges 616, hex nut 618 for turning and washer 620. It is attached to the cylinder by threads 621. There is a threaded end 624 to attach hex fuel connector 680 with its threads 682 while securing fuel line connector body 684 by hex nut 691. Fuel line connector body 684 also has protrusion 686 that presses against one way valve 650 in opening 651. Fuel line 688 is attached to 684 by clip 690 or some other appropriate method. The fuel travels along fuel line 688, though hole 685 in connector body 684 and through one way valve 650. Ceramic material 634 extends to 635 and surrounds rails 640 and 642, but there is a narrow passageway 636 through which fuel enters the cavity 648 between the rails. Each rail starts with terminal 626, then extends to the right with a narrower section for a short distance. Connectors 630 and 632 provide current for energizing the rail fuel injector. Each rail has an arc initiation protrusion 638 for initiating an arc in the gap between the rails. Ceramic material 634 and 635 insulate the conductive rails 640 and 642 from metallic body 614. Rectangular cavity 648 is between rails 640 and 642. Rail 642 reaches the front end and forms a rectangular conductor 644 (it could also be cylindrical) through which cavity 648 extends in the middle and through which fuel will be ejected, as also seen in FIG. 27A. Rail 640 is shorter and is insulated from the rectangular end conductor 644 of rail 642 by ceramic material 635. This is to prevent the arc from extending into the cylinder and pre-igniting the fuel. The rail fuel injector works in the following manner. Fuel continuously enters cavity 648 between the rails. At the proper time, voltage is applied to terminals 626. This voltage produces an arc at arc initiation protrusions 638, and current flows along the narrow sections between terminals 626 and protrusions 638. This current produces a magnetic field, which produces a JXB Lorentz force on the arc, pushing it to the right along the rails. The current path along rails 640 and 642 moves along with the arc, continuously producing a magnetic field and pushing the arc farther to the right and expelling the fuel into the cylinder and mixing it with air. The arc can not exit the opening because rail 642 is electrically one piece 644 at the opening, any arc from 640 would jump across to 644. The fuel must not be ionize to such an extent that it pre-ignites, but rather is ignited by a railplug at the proper time.

FIG. 27A is an elevational front view of the rail fuel injector shown in FIG. 27. Ceramic material 635 insulates the conductive rail section 644 from metallic body 614. Rail section 644 has a rectangular hole 648 in the middle through which fuel will be expelled into the combustion chamber. The arc can not exit opening 648 because conductive rail section 644 is electrically one piece.

Figure 28:
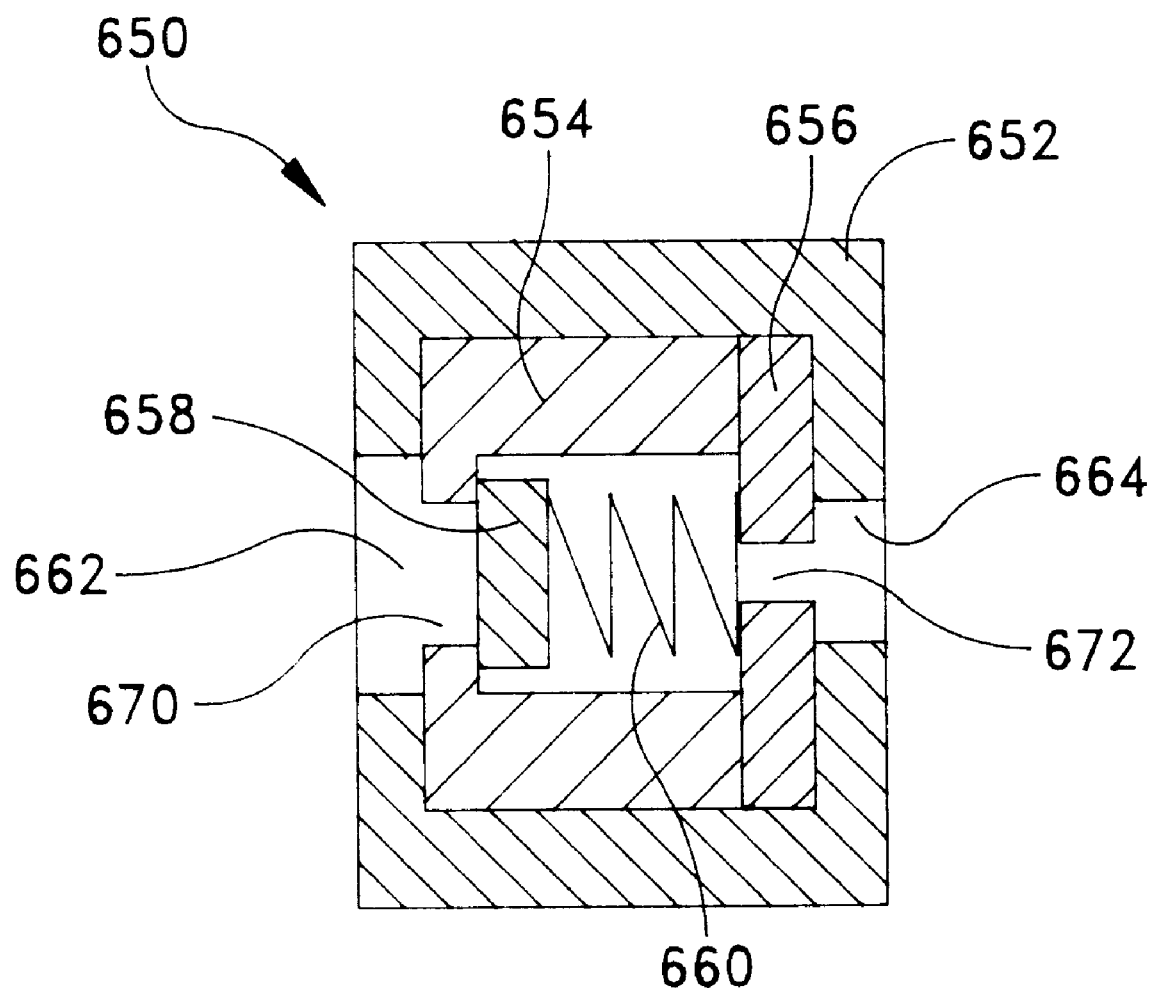
FIG. 28 is a cross sectional view of a one way valve for the rail fuel injector.

FIG. 28 is a cross sectional view of a one way valve 650 for rail fuel injector 604 of FIG. 27. Valve 650 is cylindrically shaped, and the fuel travels axially, entering opening 662 and exiting opening 664. Valve 650 has metallic cylindrical part 654 with hole 670 and disk 656 with hole 672. A high temperature synthetic material 652 encases 654 and 656 and when it is compressed by fuel line connector protrusion 686 in FIG. 27 will seal opening 651 in FIG. 27, to prevent fuel leaks. Hole 672 is very small and controls the amount of fuel that enters rail fuel injector 604. There is a stopper 658 and spring 660 that will shut off the fuel supply if the fuel pressure is below a certain amount, and will prevent the fuel from flowing backwards.

It should be understood that the embodiments that were described are only exemplary and that someone skilled in the art may make many changes and use many variations without departing from the scope and spirit of the invention as defined in the appended claims.

I claim:

1. An ignition transformer assembly for firing a spark plug of a spark ignition internal combustion engine, said transformer assembly having a multiple number of ignition transformers, each said transformer comprising:
   a. a substantially disk core having a pair of ends and constructed of a material having magnetic properties, said core having an axially central bore;
   b. a primary winding having ends, said primary winding wound about said core in a series of turns which extend longitudinally generally along an outer surface of said core, about one of said ends of said core, longitudinally generally along an inner surface of said core, and about the other of said ends of said core, said primary winding in series with other said primary windings of other said ignition transformer within said ignition transformer assembly;
   c. a secondary winding having ends, said secondary winding wound about said core in a series of turns which extend longitudinally generally along an outer surface of said core, about one of said ends of said core, longitudinally generally along an inner surface of said core, and about the other of said ends of said core, the number of said series of turns of said secondary winding is greater than said series of turns of said primary winding, and each said secondary winding has a separate high voltage isolated conductor that is isolated from every other secondary winding of every other said ignition transformer within said ignition transformer assembly, and has a common conductor that is connected to every secondary winding of every said ignition transformer within said ignition transformer assembly;

d. a dielectric housing encasing said ignition transformers;

e. a pair of terminals electrically connected to extreme ends of said primary windings of said ignition transformer assembly and adapted to be connected to an electrical power supply;

f. a second set of terminals consisting of one central common terminal electrically connected to said common conductor of said secondary windings and multiple isolated terminals electrically connected to said isolated conductors of said secondary windings, one said isolated terminal for each said isolated conductor, and adapted to be coupled to the terminals of a multi-terminal spark plug or railplug.

2. The ignition transformer assembly of claim 1, wherein each said ignition transformer further comprising a dielectric bobbin made of two sections, said bobbin sections encasing said core and having a central bore corresponding to said central bore of said core.

3. The ignition transformer assembly of claim 2, wherein each said ignition transformer has said primary winding wound about said core and said bobbin in a series of turns, said primary winding is in contact with said bobbin and is extending longitudinally generally along an outer surface of said bobbin, about one of said ends of said bobbin, longitudinally generally along an inner surface of said bobbin, and about the other of said ends of said bobbin.

4. The ignition transformer assembly of claim 2, wherein each said ignition transformer has said secondary winding wound about said core and said bobbin in a series of turns, said secondary winding is in contact with said bobbin and is extending longitudinally generally along an outer surface of said bobbin, about one of said ends of said bobbin, longitudinally generally along an inner surface of said bobbin, and about the other of said ends of said bobbin.

5. The ignition transformer assembly of claim 1, wherein dielectric disk insulators separate said ignition transformers.

6. The ignition transformer assembly of claim 1, wherein an ignition cable from said ignition transformer assembly to a spark plug connector contains an axially central common conductor and other conductors radially positioned around and parallel to said common conductor.

7. A rail spark plug or railplug for an internal combustion engine having a metal housing with threads and means for attaching said railplug to said engine, and said metal housing partially encloses an insulator containing conductive electrodes and ignition rails comprising:

a. a conductive common central electrode and multiple high voltage conductive electrodes generally axially aligned and radially positioned around said common electrode, and at end surface of said railplug said common electrode terminates at the intersection of radially diverging rails and the other said electrodes each terminate on an isolated rail of its own and generally radially follow one said common rail, forming a pair of common rail and high voltage rail, with an air gap between them;

b. each pair of said common rail and said high voltage rail has a spark initiation protrusion on each said rail facing each other and there is an air gap between each said pair of rails that extends from between said spark initiation protrusions to the end of said rails, and each pair has an exposed surface along said rails into the combustion chamber from the spark initiation protrusions to the end of said rails.

8. The railplug of claim 7, wherein the firing surface of each said spark initiation protrusion contains a precious metal selected from the group consisting of platinum, palladium, iridium or an alloy thereof.

9. The railplug of claim 8, wherein the firing surface of each said spark initiation protrusion contains said precious metal insert laser welded in place.

10. The railplug of claim 7, wherein the firing surface of each said rail contains a precious metal selected from the group consisting of platinum, palladium, iridium or an alloy thereof.

11. The railplug of claim 10, wherein the firing surface of each said rail contains said precious metal insert laser welded in place.

12. A rail fuel injector for an internal combustion engine having a metal housing with threads and means for attaching said rail fuel injector to said engine, and said metal housing at least partially enclosing an insulator containing conductive electrodes and rails comprising:

a. two conductive electrodes, each said electrode attached to a conductive rail, said rails generally parallel to each other;

b. each said rails has a spark initiation protrusion facing each other and there is a rectangular air gap between said rails that extends from between said spark initiation protrusions to the end of said rails;

c. a small fuel orifice between said rails to provide fuel into said air gap between said rails;

d. one said conductive rail is longer than the other said conductive rail and is continuous around the perimeter of said air gap at the end of said rail.

13. The rail fuel injector of claim 12, wherein the firing surface of each said spark initiation protrusion contains a precious metal selected from the group consisting of platinum, palladium, iridium or an alloy thereof.

14. The rail fuel injector of claim 13, wherein the firing surface of each said spark initiation protrusion contains said precious metal insert laser welded in place.

15. The rail fuel injector of claim 12, wherein the firing surface of each said rail contains a precious metal selected from the group consisting of platinum, palladium, iridium or an alloy thereof.

16. The rail fuel injector of claim 15, wherein the firing surface of each said rail contains said precious metal insert laser welded in place.

17. The rail fuel injector of claim 12, wherein said rail fuel injector has a one way valve to shut off said fuel if said fuel pressure is below required value and said valve has a small fuel orifice to control the amount of said fuel provided.

18. The rail fuel injector of claim 12, wherein said rail fuel injector has cooling flanges to dissipate heat.

* * * * *